United States Patent [19]

Haeberli

[11] Patent Number: 5,182,548
[45] Date of Patent: Jan. 26, 1993

[54] METHOD AND APPARATUS FOR PAINTING ON A COMPUTER

[75] Inventor: Paul E. Haeberli, Menlo Park, Calif.

[73] Assignee: Silicon Graphics, Inc., Mountain View, Calif.

[21] Appl. No.: 464,025

[22] Filed: Jan. 10, 1990

[51] Int. Cl.$^5$ ............................................. G09G 3/02
[52] U.S. Cl. .................... 340/706; 340/701; 340/709
[58] Field of Search ............ 340/701, 703, 706, 709; 364/521; 358/22; 395/118, 131, 141, 155

[56] References Cited

U.S. PATENT DOCUMENTS

| | | | |
|---|---|---|---|
| 4,766,423 | 8/1988 | One et al. | 364/521 |
| 4,807,157 | 2/1989 | Fukushima et al. | 340/701 |
| 4,864,410 | 9/1989 | Andrew et al. | 358/22 |
| 4,974,176 | 11/1990 | Buchner et al. | 340/729 |

OTHER PUBLICATIONS

Tim Field, "Using MacWrite ™ and MacPaint", 1984, pp. 4-5, 67-81.
R. Rivlin, "The Algorithmic Image", pp. 83-88.
J. D. Foley and A. Van Dam, *Fundamentals of Interactive Computer Graphics*, pp. 245-266, 456-463, and 467-468 (Addison-Wesley 1984).
R. C. Gonzales and P. Wintz, *Digital Image Processing*, pp. 161-175 (Addison-Wesley 2d Ed. 1986).
*Graphics Library User's Guide*, Version 2.0 for the IRIS-4D series computer of Silicon Graphics, Inc. of Mountain View, Calif., pp. 3-8, 4-2 through 4-5, and 4-20 (1988).
ImagePaint ™ Advertisement of ImageWare, 2 Berkeley Street, Suite 400, Toronto, Ontario, Canada M5A 4J5 (prior to Jul. 17, 1989, but date uncertain).
A. R. Smith, *Table Paint*, Jet Propulsion Laboratory, California Institute of Technology, Pasadena, Calif. 91103 (Oct. 28, 1979).
S. Strassmann, *Hairy Brushes*, Computer Graphics and Animation Group, MIT Media Laboratory, Cambridge, Mass., vol. 20, No. 4, ACM 0-89791-19-6-2/86/008/0225 Aug. 18, 1986).
T. Besler, J. Sibert, and J. McGee, *Charcoal Sketching: Returning Control to the Artist*, ACM Transactions on Graphics, pp. 76-81, vol. 7, No. 1 (Jan. 1988).
N. Lavroff, *Deluxe Paint II* manual, Electronics Arts, 1820 Gateway Drive, San Mateo, Calif. 94404 (1986).
R. Schnapp, *Super Paint 1.1* manual, Silicon Beach Software, P.O. Box 261430, San Diego, Calif. 92126 (1988).

Primary Examiner—Jeffery A. Brier
Assistant Examiner—Regina Liang
Attorney, Agent, or Firm—Blakely, Sokoloff, Taylor & Zafman

[57] ABSTRACT

A method and apparatus for painting in a computer controlled video display system is described. A current shape of a brush stroke is determined. A current direction of the brush stroke is determined. A current position is determined. A current color is set equal to a color at the current position. The step of drawing the brush image on the display comprises the steps of setting a color of the brush image equal to the current color, setting a position of the brush image equal to the current position, and setting a direction of the brush image equal to the current direction of the brush stroke.

4 Claims, 29 Drawing Sheets

FIG_4

| X .701 | Y .702 | R .703 | G .704 | B .705 | Alpha .706 | Size .707 | Direction .708 | Brush .709 |
|---|---|---|---|---|---|---|---|---|
| .447375 | .541969 | 241 | 128 | 173 | 255 | 30 | 89 | 5 |
| .444844 | .531781 | 220 | 57 | 35 | 255 | 30 | 89 | 5 |
| .441063 | .524156 | 172 | 29 | 1 | 255 | 30 | 89 | 5 |
| .444844 | .553406 | 230 | 100 | 75 | 255 | 30 | 89 | 5 |
| . | . | . | . | . | . | . | . | . |

FIG_8A
FIG_8B
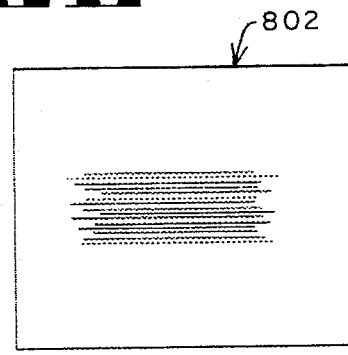
FIG_8C
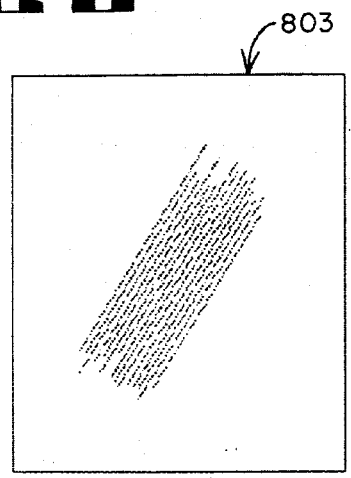

FIG_8D

FIG_11

FIG _ 19A
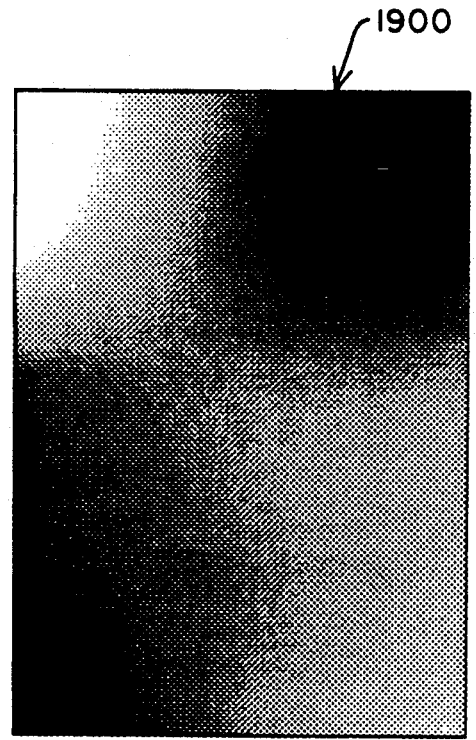

FIG_19B

FIG _ 21A
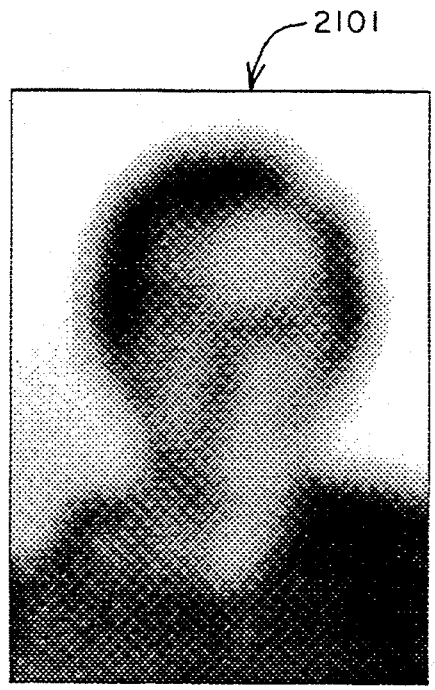
FIG _ 21B

FIG_21C

METHOD AND APPARATUS FOR PAINTING ON A COMPUTER

FIELD OF THE INVENTION

The present invention pertains to the field of computer-controlled video display systems for presenting two-dimensional graphic representations on a video display or on a printed or projected output. More particularly, this invention relates to modifying existing graphic images within a system so that the images approximate paintings and sketches, such as paintings and sketches done with oil paints, acrylics, watercolors, and charcoals.

BACKGROUND OF THE INVENTION

Graphic designers are experts at visual communication. Although graphic designers use photographic images when such images are appropriate, designers often use more abstract images, such as those found in sketches and paintings. This design choice is based upon the information the designer wishes to communicate. A realistic photographic image may sometimes be less effective at conveying information than a stylized image. In many cases, the designer must balance realism and effectiveness.

Many of the details of a photographic image may distract the viewer from the subject of the picture. Perfectly smooth surfaces and detailed edges coupled with a sharp focus can increase detail and, accordingly, increase the number of visual distractions. If the image is made more abstract by removing some details, the viewer sometimes can concentrate on the subject of the image with less distraction. To create an effective image, it therefore is important to select the central information to be conveyed by the picture and eliminate visual information that distracts or confuses the viewer. Sometimes it is desirable to vary the amount of detail across an image in order to direct a viewer's attention to the most important parts of the image.

One important use of illustration is to communicate the unique character that distinguishes the subject. For instance, persons sometimes find it easier to identify plants and birds in illustrations than in photographs if in the illustrations an artist emphasizes the important visual information about the plants and birds. In commercial and fine arts, graphic artists have used various techniques to present images and filter visual information. The artist can obscure or enhance certain details in order to direct the viewer's attention to given parts of the image. By controlling the color, size, shape, and orientation of brush strokes, an artist is able to direct the viewer to various details that convey specific information. These techniques avoid distracting the viewer with unnecessary detail. Various techniques of using stylized brush strokes to represent images have been popularized by many of the great impressionist painters, such as Monet, Van Gough, and Sargent.

In short, abstract images are sometimes preferred over photographic images.

SUMMARY AND OBJECTS OF THE INVENTION

One object of the present invention is to provide a technique that yields an abstract image on a computer system.

Another objective of the present invention is to provide a method for modifying graphic images on a computer system.

These and other objects of the invention are provided for by a method and apparatus for painting in a computer controlled video display system. A current shape is determined, a current direction of a brush stroke is determined, and a current position is determined. A current color is set equal to a color at the current position. A brush image is drawn on a display, wherein the brush image has a same shape as the brush stroke. The step of drawing the brush image on the display comprises the steps of setting a color of the brush image equal to the current color, setting a position of the brush image equal to the current position, and setting a direction of the brush image equal to the current direction of the brush stroke.

These and other objects of the invention are provided for by a method for painting in a computer controlled video display system. A current shape of a brush stroke is determined, a current direction of the brush stroke is determined, and a current position on a first image is determined. A current color is set equal to a color at the current position on the first image. A copy of the brush image is placed into a second image, wherein the brush image has a same shape as the brush stroke. The step of placing a copy of the brush image into a second image comprises the steps of setting a color of the brush image equal to the current color, setting a position of the brush image equal to the current position, and setting a direction of the brush image equal to the current direction of the brush stroke.

These and other objects of the invention are provided for by perturbing the brush position, the brush color, and the brush direction prior to placing a brush image in a second image.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 7 illustrates a file used for representing a given graphic image comprising a plurality of brush strokes.

FIG. 8 shows a bit-mapped image, a bit-mapped brush stroke, and the brush stroke before and after rotation. The figure also shows the result of converting the input image into a series of brush strokes.

FIG. 19 shows a second image from which luminance values may be obtained and a resulting image that has the brush strokes controlled by the second image.

FIG. 21 illustrates images associated with the steps of generating an image by controlling the brush stroke direction with a gradient of another image.

DETAILED DESCRIPTION

Figure 1:
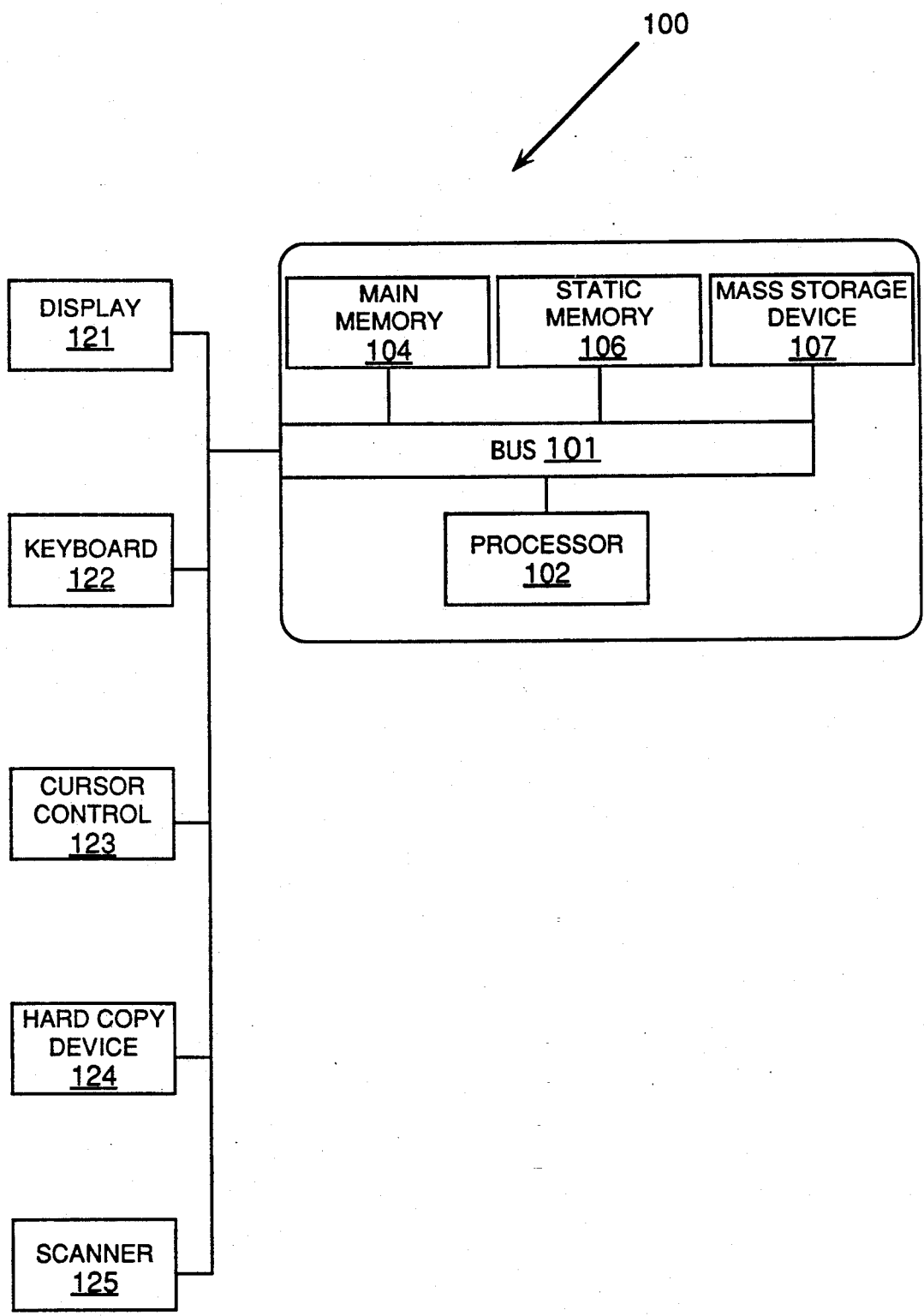
FIG. 1 is a block diagram of a computer system that is used in a preferred embodiment.

FIG. 1 illustrates computer system 100 upon which a preferred embodiment of the present invention is implemented. Computer system 100 comprises a bus or other communication means 101 for communicating information, a processing means 102 coupled with bus 101 for processing information, and a random access memory (RAM) or other dynamic storage device 104 (commonly referred to as main memory) coupled to bus 101 for storing information and instructions for processor 102. Computer system 100 also comprises a read only memory (ROM) or other static storage device 106 coupled to bus 101 for storing static information and instructions for the processor 102, a data storage device 107, such as a magnetic disk or optical disk and disk drive, coupled to bus 101 for storing information and instructions. Computer system 100 further comprises a display device 121, such as a cathode ray tube ("CRT"), coupled to bus 101 for displaying information to the computer user, an alpha-numeric input device 122, including alpha numeric and other keys, coupled to bus 101 for communicating information and command selections to processor 102, and a cursor control device 123, such as a mouse, a track ball, or cursor direction keys, coupled to bus 101 for communicating direction information and command selections to processor 102 and for controlling said cursor movement. It is also useful if the system includes a hard copy device 124, such as a printer, for providing permanent copies of information on paper, film, or other physical media with which the user can visually examine information. The hard copy device 124 is coupled to the processor 102, main memory 104, static memory 106, and mass storage device 107 through bus 101. Finally, it is useful if a scanner 125 is coupled to bus 101 for digitizing graphic images.

Processor 102 of a preferred embodiment is an R2000 series reduced instruction set ("RISC") microprocessor manufactured by MIPS Corporation of Sunnyvale, Calif. In a preferred embodiment, the Unix System V operating system is used on computer system 100.

Figure 2A:
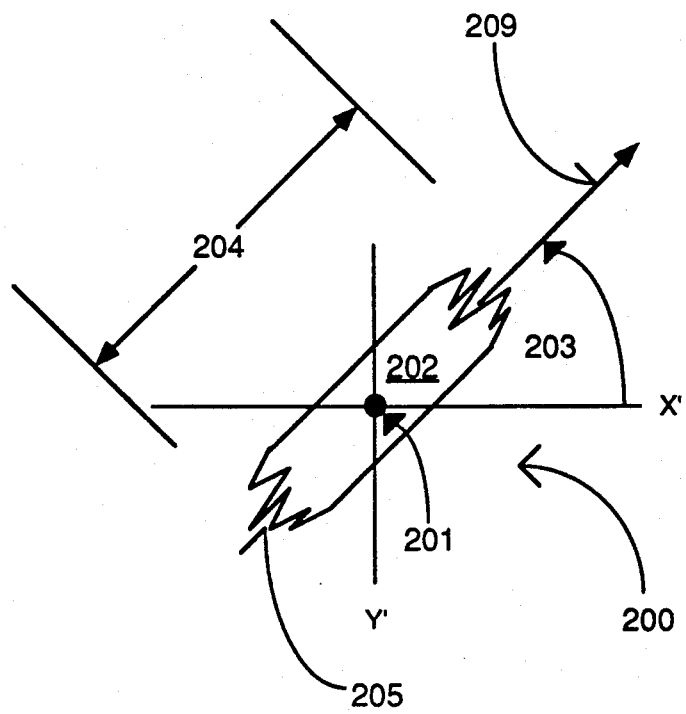
FIG. 2 shows a brush stroke.
Figure 2B:
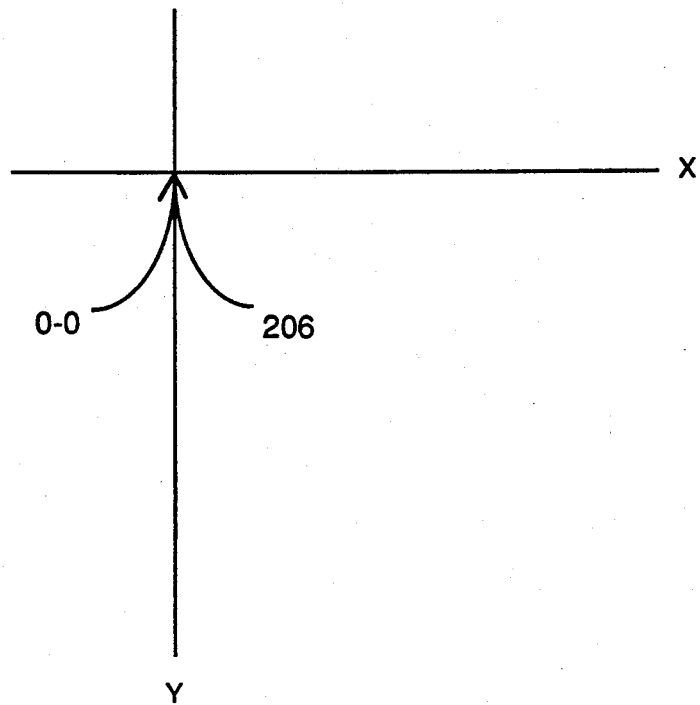

FIG. 2 shows a brush stroke 200 of a preferred embodiment of the present invention. The brush stroke is encoded in main memory 104 of FIG. 1 and may be displayed on a display 121. As shown in FIG. 2, a brush stroke 200 may be represented on computer 100 by using the following five discrete components that characterize brush stroke 200: (1) a position 201 of brush stroke 200, (2) a color 202 of brush stroke 200, (3) a direction 203 of brush stroke 200, (4) a size 204 of brush stroke 200, and (5) a shape 205 of brush stroke 200.

Figure 3:
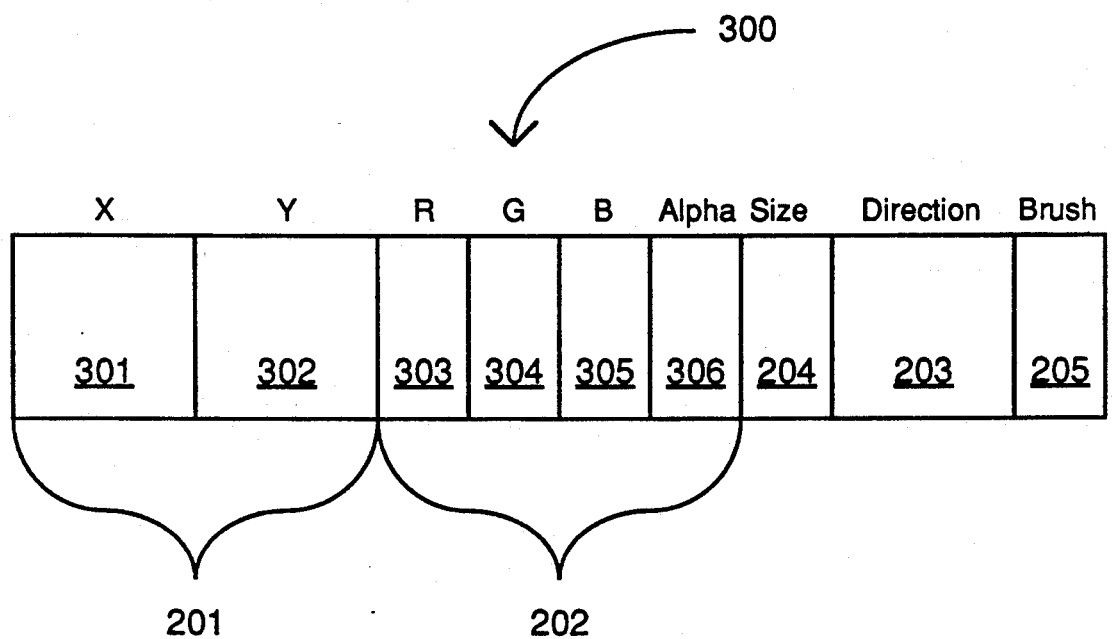
FIG. 3 shows how a given brush stroke may be represented as a datum in a computer system.

With reference to FIG. 3, position 201 comprises two discrete components: X 301 and Y 302. X 301 represents a displacement from the X-Y origin 206 of FIG. 2 in a horizontal direction. Y 302 represents a vertical displacement from origin 206. Point 201 of FIGS. 2 and 3 represents the location of the center of the brush. As discussed below, the routine moves the origin of the X-Y coordinate system from point 206 to center point 201. In other words, the routine translates the origin of the coordinate system of the brush from point 206 to point 201, which is defined by X 301 and Y 302 of FIG. 3.

The color 202 in datum 300 of FIG. 3 comprises four discrete components: red 303, green 304, blue 305, and alpha 306. Alpha 306 is a transparency factor. In one embodiment of the present invention, color 202 represents the color at point 201.

In one embodiment of the present invention, the red, green, and blue values of the pixel at point 201 of an input image become the values of red 303, green 304, and blue 305, respectively, of brush stroke 200. In that embodiment, the values stored as red 303, green 304, and blue 305 determine the color of all the pixels of brush image 200, not just the pixel at point 201. Although brush stroke 200 could be comprised of a single pixel, brush stroke 200 could also be comprised of numerous pixels, and color 202 would for that embodiment apply to all those pixels.

Red 303, green 304, and blue 305 represent magnitudes of the respective colors red, green, and blue. In an additive color model, a color can be represented using these three color components. A minimum value in this model represents a minimum brightness of the particular color. A maximum value represents a maximum brightness of the particular color. In a cathode ray tube display output device having a phosphor screen and electron guns to illuminate phosphor dots of the screen, red 303, green 304, and blue 305 correspond to respective magnitudes of signals to three electron guns that illuminate the phosphor dots of the screen.

Alpha component 306—also referred to as transparency factor 306—of color 202 is used by display system 100 to modify the red, green, and blue values sent to the output device 121 of FIG. 1. Certain values of alpha 306 make brush stroke 200 act as if it were a translucent brush stroke. When a brush stroke is drawn, each pixel of the drawing within the area of brush stroke 200 receives red, green, and blue values equal to the following:

(alpha 306)·(red 303, green 304, and blue 305 of brush stroke 200) + (1 − alpha 306)·(the red, green, and blue values of the particular pixel of the drawing).

It follows from this relationship that if alpha 306 is zero, then a pixel of the drawing is not modified. If alpha 306 is "one" (base 10), then the present color of the pixel of the drawing is replaced by the red 303, green 304, and blue 305 color of brush stroke 200. If alpha is greater than zero but less than "one" (base 10), then the color of the pixel of the drawing is replaced by a color that is a blending of the color of the brush stroke and the color of the pixel of the drawing. The blending is governed by the above formula.

In an alternative embodiment of the present invention, the red 303, green 304, blue 305, and alpha 306 components of color 202 are not used. Instead color 202 simply comprises a number stored in datum 300 that corresponds to a luminance value of an electron gun for a display that only displays black and white. In such an embodiment, the luminance value ranges from a minimum value—which corresponds to "black"—to a maximum value—which corresponds to "white." The values between the minimum and maximum values represent various shades of grey.

As shown in FIG. 3, another component of the datum describing brush stroke 200 is direction 203. As seen in FIG. 2, a number stored as direction 203 corresponds to the value of an angle between (1) a vector 209 aligned with brush stroke 200 and (2) the X' axis. Direction 203 is a positive number for a counterclockwise rotation of vector 209 from the X' axis.

As discussed below, one of the steps for drawing a brush is to rotate a coordinate system by the number the degrees stored as direction 203. The rotation will be about a Z axis through point 201. The rotation will be in a counterclockwise direction for a positive direction 203.

Although direction 203 in the present embodiment represents degrees, direction 203 may be in an alternative embodiment be stored as radians.

In FIG. 3, size 204 is included in the remaining portion of datum 300. Size 204 allows a coordinate system of brush stroke 200 to be scaled prior to computer system 100 providing an output to a file or a frame buffer. In a preferred embodiment, a size value of "one" (base 10) will generate a resulting brush stroke that is the same size as the original brush stroke. A size 204 equal to "two" (base 10) will generate a brush stroke that is exactly twice the size of the original brush stroke in both the horizontal and vertical directions. In a preferred embodiment, the size of the brush stroke 200 can range from a single pixel up to the size of display device 121 of computer system.

The last field of datum 300 of FIG. 3 is brush 205. Brush value 205 is an arbitrary value representing a particular brush style chosen by the user of computer system 100. The value may describe a particular polygon, bit map image, or graphics primitive according to the user's particular application. For instance, a brush field 205 containing a value of one (base 10) could be associated with a circle, and a value of two (base 10) could be associated with a square. These values, aside from being associated with particular types of brush shapes, may also be associated with particular graphics library primitive routines, as will be discussed below.

Figure 4:
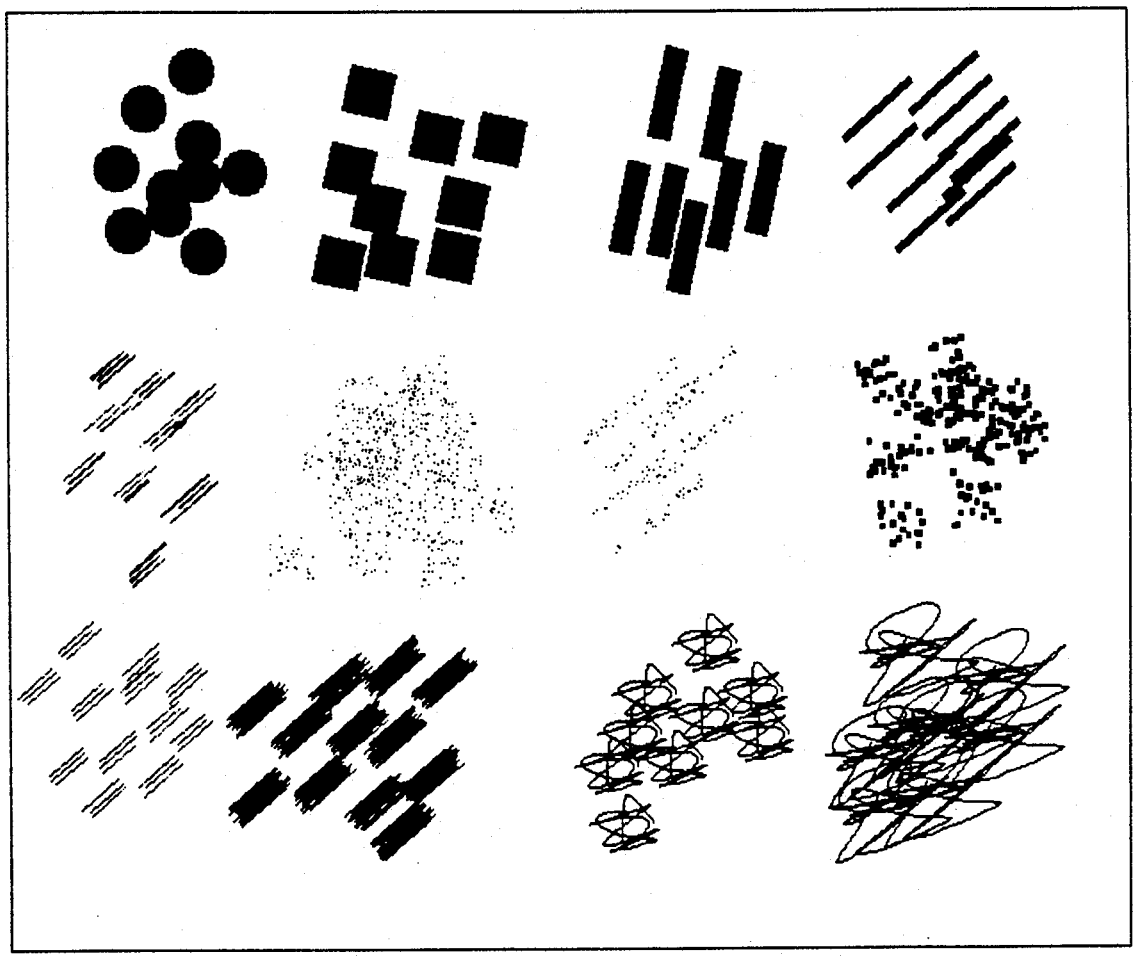
FIG. 4 shows brush stroke shapes for the brush shape field of the brush stroke datum.

Examples of several brush stroke types which may be chosen by the user are illustrated in FIG. 4.

Figure 5:
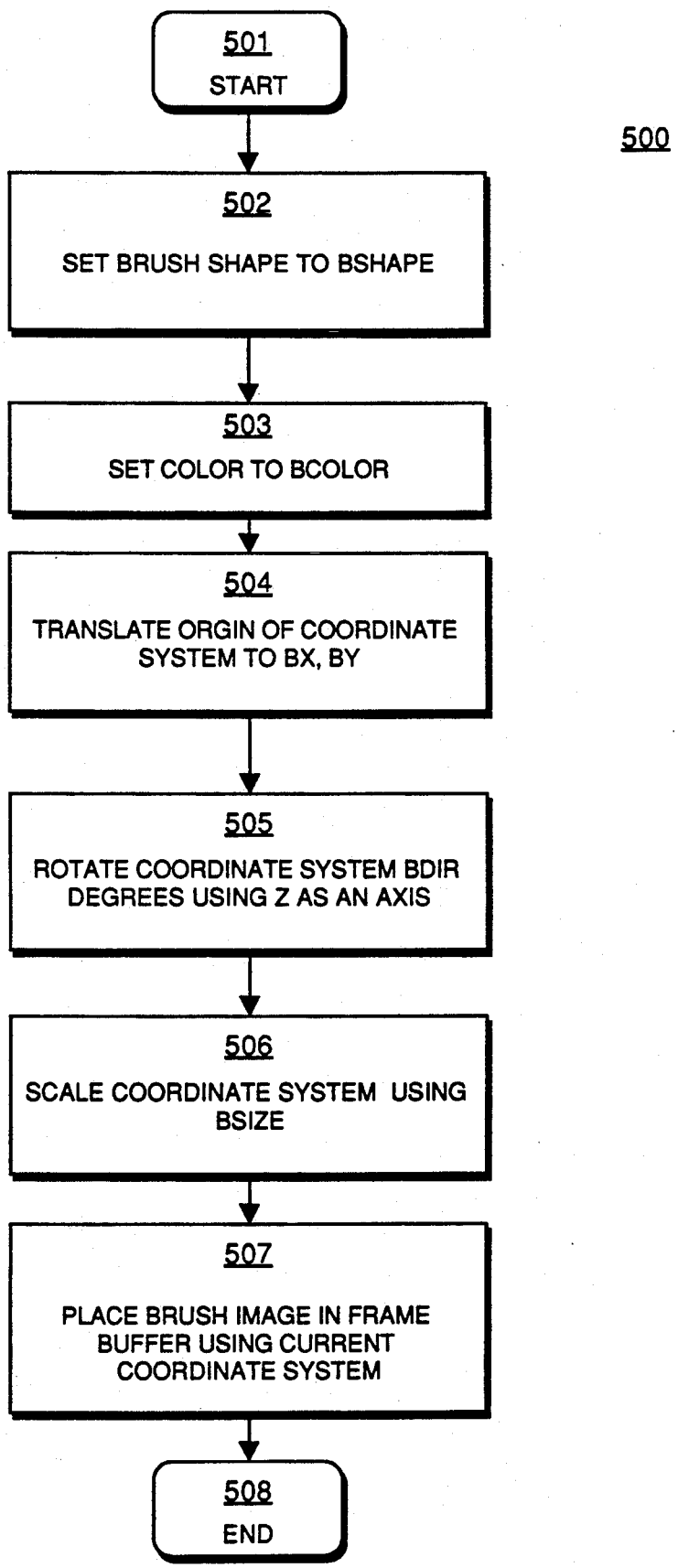
FIG. 5 sets forth steps for drawing a brush.

The steps for drawing a brush stroke into a frame buffer (or file) of computer system 100 are set forth in FIG. 5. The brush can be a polygon, and thus the steps of FIG. 5 are also referred to as steps for drawing a polygon. The routine of FIG. 5 uses primitive routines, including a set color routine (step 503), a coordinate system translation operation (step 504), a coordinate system rotation function (step 505), and a coordinate system scaling operation (step 506). Certain known computer graphics routines are discussed in *Fundamentals Of Interactive Computer Graphics* (1984) by J. D. Foley and A. Van Dam ("Foley and Van Dam") at pages.

Referring to FIG. 5, draw brush process 500 starts at block 501 and continues to block 502. At step 502, the brush shape is set equal to BSHAPE, which is a value passed to draw brush process 500. BSHAPE corresponds to the polygonal shape of the brush that has been chosen by the user of computer system 100. In a preferred embodiment, BSHAPE comprises brush value 205 of datum 300 of FIG. 3.

At step 503, the polygon (i.e., brush) color is set to color BCOLOR that has been passed via input parameters to draw brush process 500. In a preferred embodiment, the input parameters of BCOLOR are red 303, green 304, blue 305, and alpha 306 of color 202 of datum 300 of FIG. 3. The parameters red 303, green 304, blue 305, would be the respective values found at point 201 on a display or image.

Step 504 translates the origin of the coordinate system brush from the origin point 206 (i.e., 0—0) of FIG. 2 to the BX-BY point specified in the input datum. In a preferred embodiment, BX is X 301 of datum 300 and BY is Y 302 of datum 300 of FIG. 3.

At step 505, the X-Y coordinate system having point BX-BY as its origin is rotated by BDIR degrees, which are the number of degrees passed to process 500. The rotation will be about a Z axis through point BX-BY, wherein the Z axis is perpendicular to the X and Y axes. The rotation will be in a counterclockwise direction for positive degrees. In a preferred embodiment, BDIR degrees come from direction 203 of datum 300 of FIG. 3.

Step 506 then comprises scaling the coordinate system of the polygon or brush according to the brush size passed to process 500. For instance, if the scale function received a "2" as brush size, then the brush would be doubled in both its X and Y components, thus making it larger than the original brush stroke. In a preferred embodiment, the brush size is given by size 204 of datum 300 of FIG. 3.

At step 507, a copy of the scaled rotated brush image (i.e., polygon) that has been chosen is placed in a frame buffer of computer system 100 according to the BX and BY position parameters using the particular red, green, blue, and alpha values of BCOLOR. During step 507, when the particular polygon or bit-mapped brush stroke is placed into the frame buffer, the alpha value of the brush stroke, such as 306 of FIG. 3, may be used to modify the existing pixel color values in the frame buffer. In this way, when a brush stroke is being drawn into the frame buffer, if a pixel is being modified by the placement of the brush stroke, then the resulting pixel color value at that location will be as follows:

New RGB Pixel Value=Alpha·(RGB Value of Brush Stroke)+(1−Alpha)·(Old RGB Pixel Value)

Therefore, translucent brush stroke colors may be simulated which allow the existing image in the frame buffer to be displayed through the brush strokes which are placed on top of it. The routine ends at step 508.

The steps of the draw brush routine of FIG. 5 are now described with reference to brush stroke 600 of FIG. 6. The process starts with block 501 and moves to step 502. For brush stroke 600, BSHAPE of step 502 is a value that corresponds to a rectangle. That means that the user has chosen a rectangle from the menu of possible brush shapes.

At step 503, the color 601 of the entire rectangular brush stroke 605 is set based on the color at point 602. Step 503 corresponds to a Drawcolor command.

A Translate (4,5,0) command corresponds to step 504 of FIG. 5. The 4,5, and 0 components of that particular Translate command correspond respectively to the X, Y, and Z coordinates of point 602 of FIG. 6. The Translate (4,5,0) command triggers a translate function that moves the origin of the X-Y coordinate system from point 608 to point 602 of FIG. 6.

A Rotate (45, "Z") command corresponds to step 505 of FIG. 5. The "45" in the Rotate (45, "Z") command indicates that the angle between the X' axis and vector 609 aligned with brush rectangle 605 is 45 degrees. The rotation of brush stroke 605 is in a counterclockwise direction about a Z axis. The Z axis runs through point 602 and is perpendicular to the X and Y axes.

A scale (2) command corresponds to step 506 of FIG. 5. Given that the scale command includes the number "2" (base 10), each of the sides 621, 622, 623, and 624 are doubled in length. Thus, rectangle 605 is increased in size.

Figure 6A:
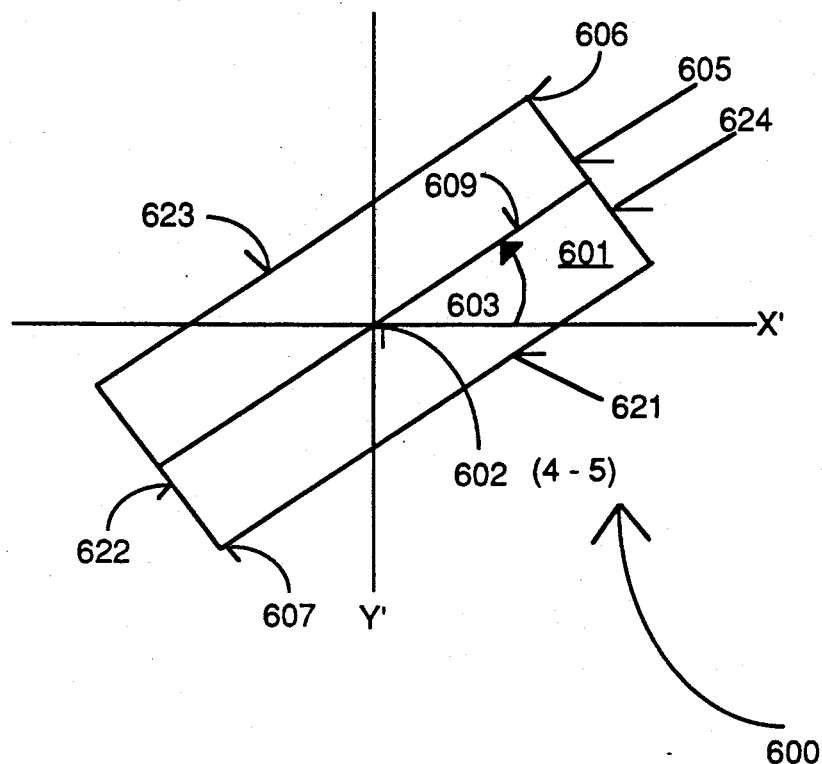
FIG. 6 illustrates a brush stroke that may be drawn.
Figure 6B:
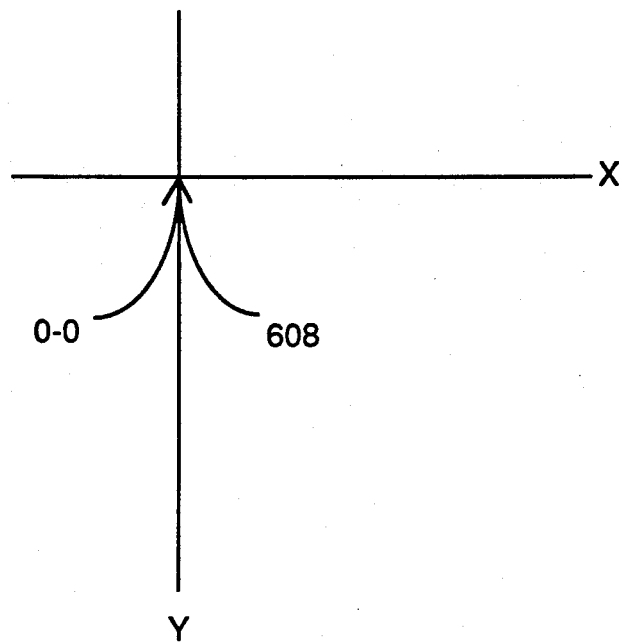

For brush stroke 605 of FIG. 6, the command Rectf (−1.0, −0.3, 1.0, 0.3) corresponds to step 507 of FIG. 5. The Rectf (−1.0, −0.3, 1.0, 0.3) command is a graphics primitive that generates a filled rectangular brush image and places that image in a frame buffer of computer system 100. The numbers −1.0 and −0.3 are the X-Y coordinates of one corner of the rectangular brush image and they correspond to point 607 of FIG. 6. Point 607 is the starting corner of rectangle 605. The numbers 1.0 and 0.3 are the X-Y coordinates of an opposite corner of the rectangular brush image and they correspond to point 606 of FIG. 6.

An example of a generalized polygon drawing primitive is set forth in Foley and Van Dam at pages 456 through 463.

Depending on the value passed to the draw brush process 500 in FIG. 5, any of a number of brushes, for example those shown in FIG. 4, may be drawn. The particular example of FIG. 6 is filled rectangle between the points 606 and 607. Any of a number of graphics primitives may be inserted in place of the "Rectf" function to draw a polygon at the point and angle specified by the parameters passed in the input datum 300 to draw brush process 500.

Any number of brush strokes may be represented using the foregoing technique. An array 700 of brush strokes that describes an entire painting is shown in FIG. 7. Array 700 is also referred to as file 700. Array 700 has position X fields 701; position Y fields 702; color fields 703 (red), 704 (green), 705 (blue), and 706 (alpha); size fields 707; direction fields 708; and brush shape fields 709.

In FIG. 8, painting 804 is formed by using (1) an original image 801 and (2) brush stroke 802, which is a geometric or brush stroke that is rotated to form brush stroke 803. Painting 804 is comprised of brush strokes 803 distributed at various points throughout the painting.

Painting 804 may be represented as a text file similar to file 700 of FIG. 7. No particular encoding scheme is needed as long as each brush stroke is represented in the same manner as all of the other brush strokes. Using the scheme 500 as set forth in FIG. 5 for each element in 700, an entire file such as text file 700 of FIG. 7 may be processed and displayed on computer system 100.

Figure 9:
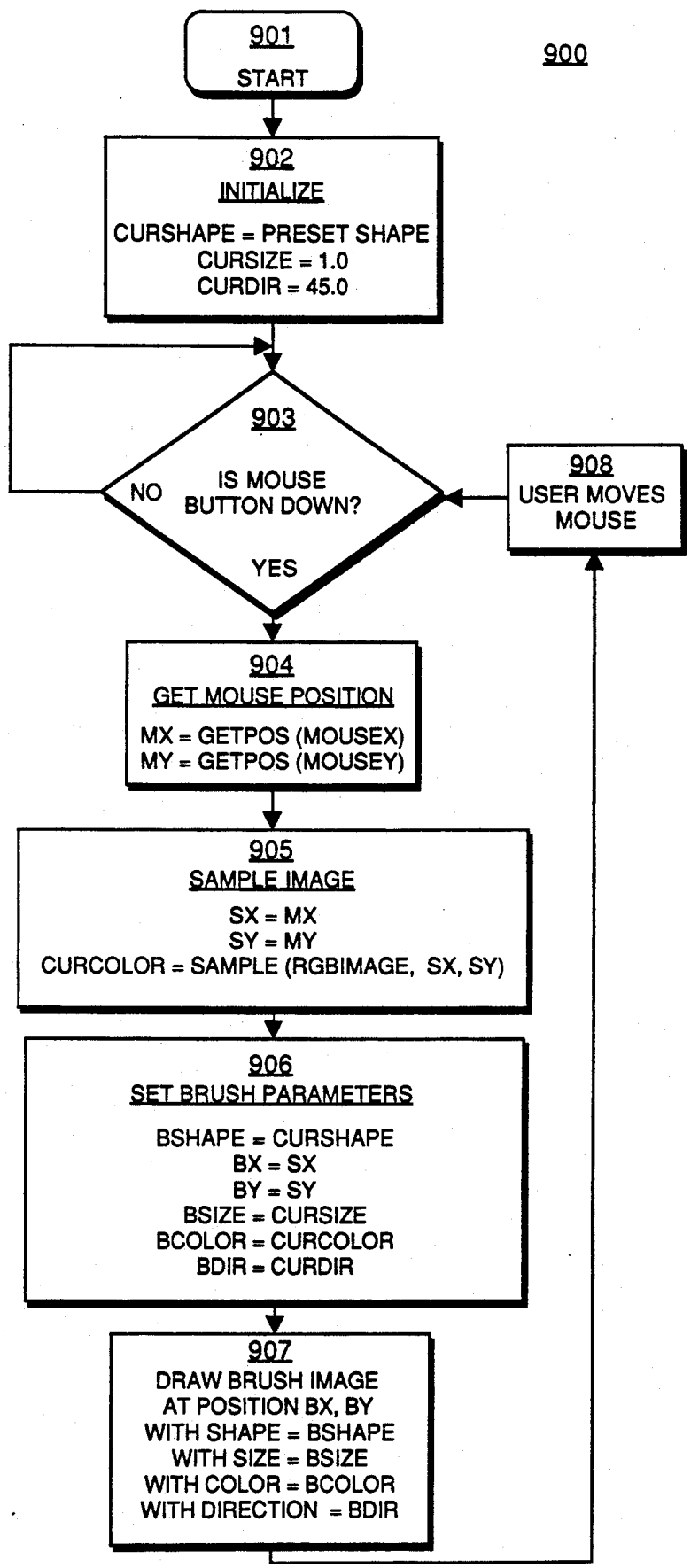
FIG. 9 is a flowchart of an interactive method for painting wherein an existing bit-mapped image is converted into an image represented as a series of brush strokes.

Brush strokes themselves can be the subject of operations. A user of computer system 100 can control the brush strokes in real time using input cursor control 123 of FIG. 1. Cursor control 123 can be a track ball or a mouse, for example. FIG. 9 sets forth technique 900 for modifying a bit-mapped screen image, such as image 801 of FIG. 8 and converting that bit-mapped image into a series of brush strokes. Process 900 is an interactive technique that uses cursor control 123 of FIG. 1 and a file similar to file 700 of FIG. 7. Process 900 starts at block 901. At step 902, all of internal vaiables are initialized. The current brush stroke size is set to 1.0. The current brush stroke shape is set to a preset shape. The brush stroke shape is set when the user picks a brush shape from a menu or shape selection palette of computer 100. The current brush stroke direction is set to 45.0 degrees.

At step 903, process 900 samples one of the mouse buttons from input device 123 to see if the user wishes to start painting. If the mouse button is not depressed, step 903 is repeated. The mouse button is thus tested until it is depressed. A user depresses the mouse button to indicate his or her desire to start painting. If the user does wish to start painting, and accordingly depresses the mouse button, then the mouse position is sampled at block 904. A "GETPOS" operation will return a current location of a cursor on a display according to a mouse position. The current X and Y position of the mouse is then stored as respective internal variables MX and MY.

At step 905 the variables SX and SY are set to MX and MY, respectively. The current color associated with point SX-SY on the input image is sampled. Given an input X value and an input Y value, the "GETPOS" operation returns a value associated with a pixel residing at that location on the display or in a file, such as a color value or direction value. Process 900 then proceeds to step 906, whereupon all of the brush parameters are set to their appropriate values. The brush shape is set to the current brush shape. The brush position X-Y is set to the currently sampled position X-Y. The brush size is set to the currently set brush size. The brush color is set equal to the currently sampled brush color. The brush stroke direction is set equal to the currently set brush stroke direction. At step 907, the brush is drawn using process 500 of FIG. 5 and the parameters set in step 906 of FIG. 9.

The user may move the mouse during step 908 and process 900 continues to step 903. Once again, step 903 is used to determine whether the mouse button is depressed. Steps 903 through 908 are repeated as long as the user is depressing the mouse button. As long as the mouse button remains depressed, multiple copies of the brush stroke are placed into the output image or frame buffer at step 907, achieving a smearing affect for each of the sampled cursor positions. If an entire bit-mapped image is sampled using process 900, the image may be stored as a text file in a format similar to that of file 700 in FIG. 7. This is accomplished by replacing step 907 with a step that writes each value into an output file.

Final image 804 results when many pixel positions on the screen have been sampled and converted to brush strokes using process 900 of FIG. 9.

Figure 10:
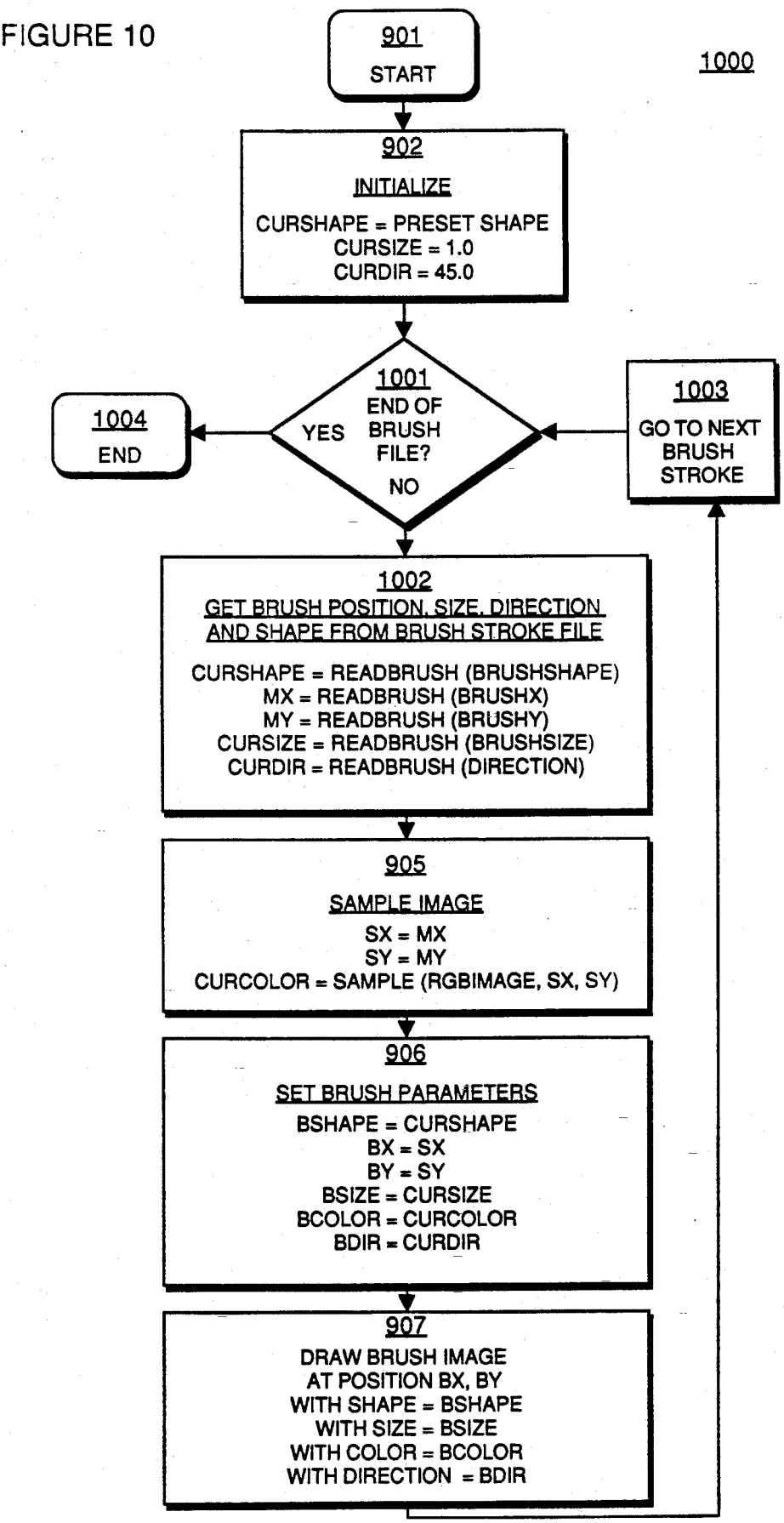
FIG. 10 sets forth steps for converting an existing bit-mapped image to a representation comprising brush strokes, wherein a previously stored set of brush shapes, positions, sizes, and directions is used.

Process 900 of FIG. 9 may be used in a non-interactive mode as well. This non-interactive mode is set forth in FIG. 10. Process 1000 contains many of the same steps as process 900 in FIG. 9 except that step 903 is now replaced by step 1001, step 904 is replaced by step 1002, step 908 is replaced by step 1003, and step 1001 will branch to an "END" step 1004 when the end of a brush file condition has been met. Process 1000 will read each individual brush stroke from an input brush file and modify an existing bit-mapped image in a file or on a display. Process 1000 starts at step 901. At step 902, process 1000 initializes the current brush stroke shape, the current brush stroke size, and the current brush stroke direction. Process 1000 then continues to step 1001, wherein an end of the brush file condition is tested. If the end of the brush file has been reached, then the process terminates at step 1004. If, however, the end of the brush file has not been reached, process 1000 proceeds to step 1002, which reads a brush stroke shape position, size, and direction, from the input brush file. Process 1000 then proceeds normally as in process 900 to step 905 to sample the color of the input image at the brush position for its color. At steps 906 and 907, the brush stroke parameters are set and the brush is drawn using the brush stroke shape, position, size, and direction. After step 907, process 1000 proceeds to step 1003, wherein process 1000 will proceed to the next brush stroke from the input brush stroke file, and then to step 1001, which again checks to see if the end of the brush stroke file has been reached. As mentioned previously, if step 1001 determines that an end of file condition is present, then the process proceeds to step 1004 and ends. Steps 1001, 1002, 905, 906, 907 and 1003 are repeated until all of the brush strokes in the input brush stroke file have been read and the entire image is accordingly processed.

Figure 11:
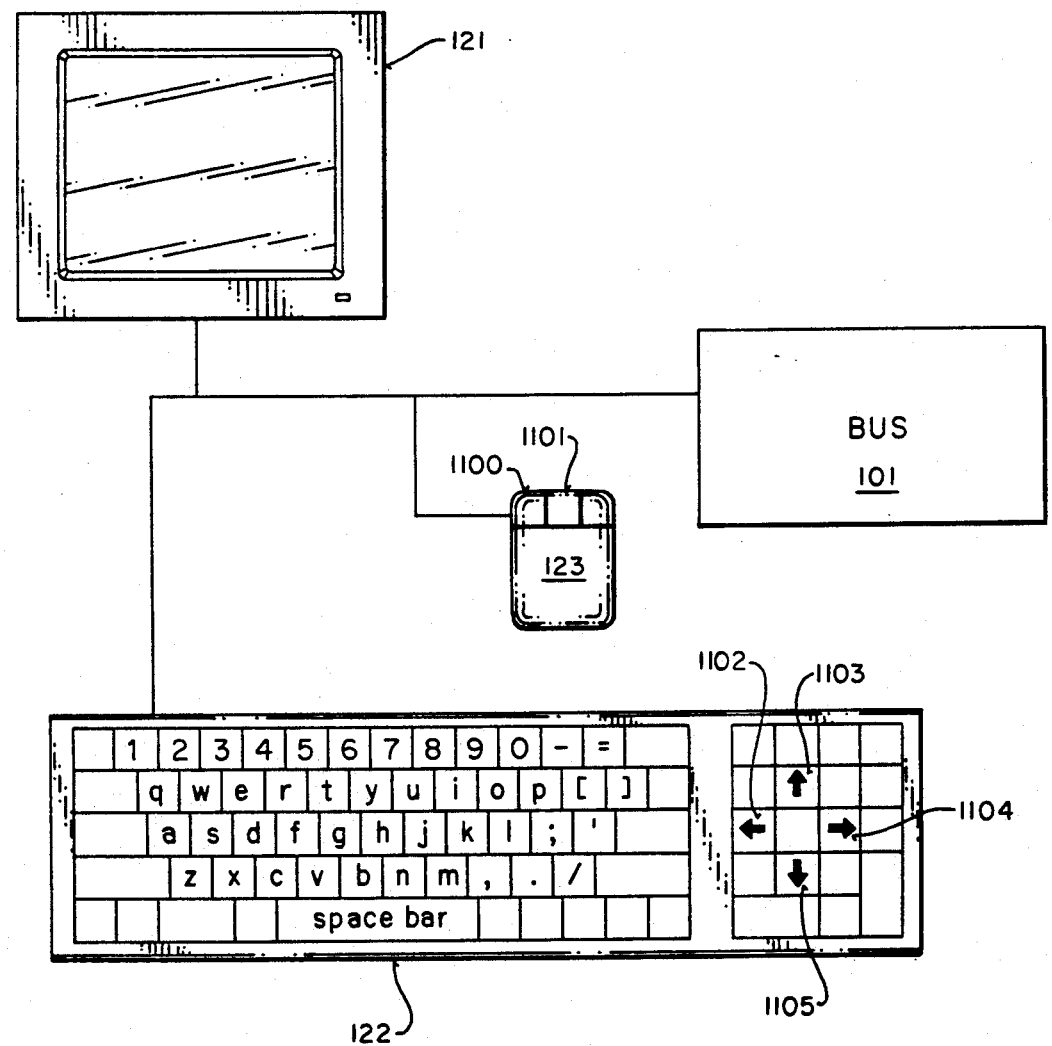
FIG. 11 illustrates a display and various input devices for a preferred embodiment.

The current size of the brush stroke may be modified in numerous ways, such as by a gesture of the input device 123 of FIG. 1 or by any of the cursor direction keys on keyboard 122 of FIG. 1. FIG. 11 shows a detailed representation of input device 123 as a three button mouse comprising mouse buttons 1100 and 1101. FIG. 11 also shows a detailed representation of keyboard 122 with cursor control position keys 1102 through 1105. Given that (1) the current size of the brush stroke in process 900 in FIG. 9 may be changed using a mouse gesture and (2) mouse button 1100 is used for indicating whether the user is currently painting (as determined by step 903 of process 900), center button 1101 of mouse 123 may be used to input a current direction of brush strokes for the resulting painting.

Figure 12:
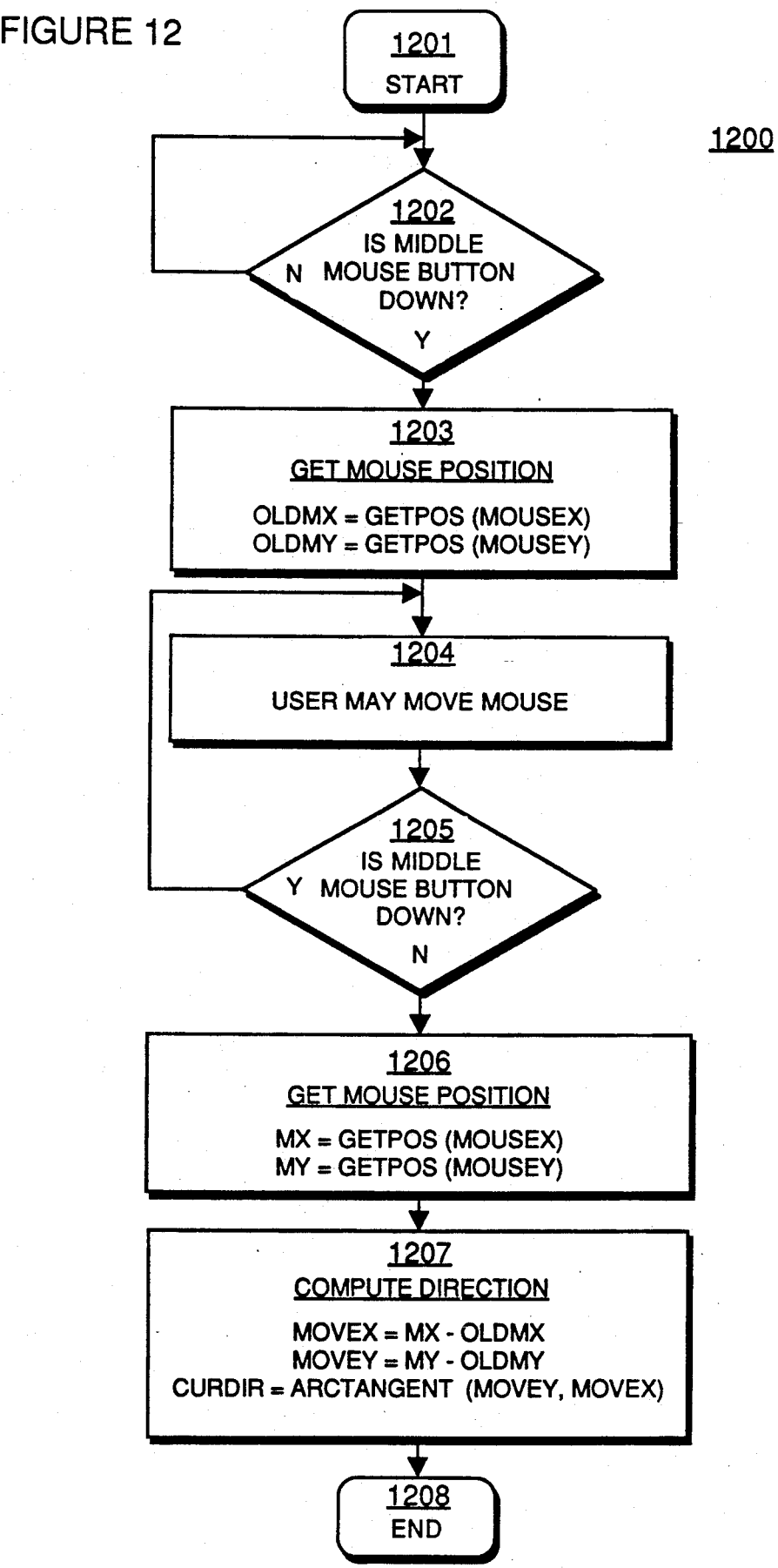
FIG. 12 sets forth steps for modifying the current brush stroke direction using a mouse gesture.

An example of a process for setting the current direction of brush strokes using a mouse gesture of mouse 123 is shown in FIG. 12. Process 1200 starts at step 1201 and determines at step 1202 whether the middle mouse button 1101 has been depressed. If it has been depressed, then the process proceeds onto step 1203. But if it has not, the process stays in a loop and waits for activity on the middle mouse button. If the mouse button has been depressed, step 1203 samples the current mouse position, and the user may then move the mouse in any direction at step 1204. The process checks at step 1205 to see whether the middle mouse button is still depressed, and if it is, the process loops until such time as the button is no longer depressed. At step 1206, once the mouse position is no longer depressed, the process proceeds to step 1207.

Step 1207 determines the difference between the new mouse position and the old mouse position for both the X and Y displacements. The current direction of the brush stroke is set to the arctangent of the Y displacement and the X displacement. The function "Arctangent" as shown in block 1207 on FIG. 12 produces the arctangent of the input Y movement value divided by the input X movement value. Additionally, "arctangent" uses the signs of the X and Y movement values to determine the appropriate angle of the vector from the origin to the X and point in 2-D coordinate space. Like the direction value 203 in FIG. 2 mentioned previously, the value produced by ARCTANGENT is an angle relative to the positive X axis of a vector, such as 209 in FIG. 2, in a counterclockwise direction. Therefore, given a positive X and Y movement value in a Euclidean coordinate system, the angle produced by arctangent is in a range of from 0 to 90. Given a negative X and a positive Y movement value, arctangent will produce a value from 90 to 180. Given negative values for both, the angle produced will be from 180 to 270, and given a positive X movement value and a negative Y movement value, the angle produced will range from 270 to 0. The process 1200 ends at step 1208 yielding the final brush stroke current direction for use by a painting process, such as that shown in FIG. 9. This process 1200 generates a current brush stroke direction from the angle relative to the X axis of the vector created starting at the point at which the user depresses the mouse button and the point when he releases it.

Figure 13:
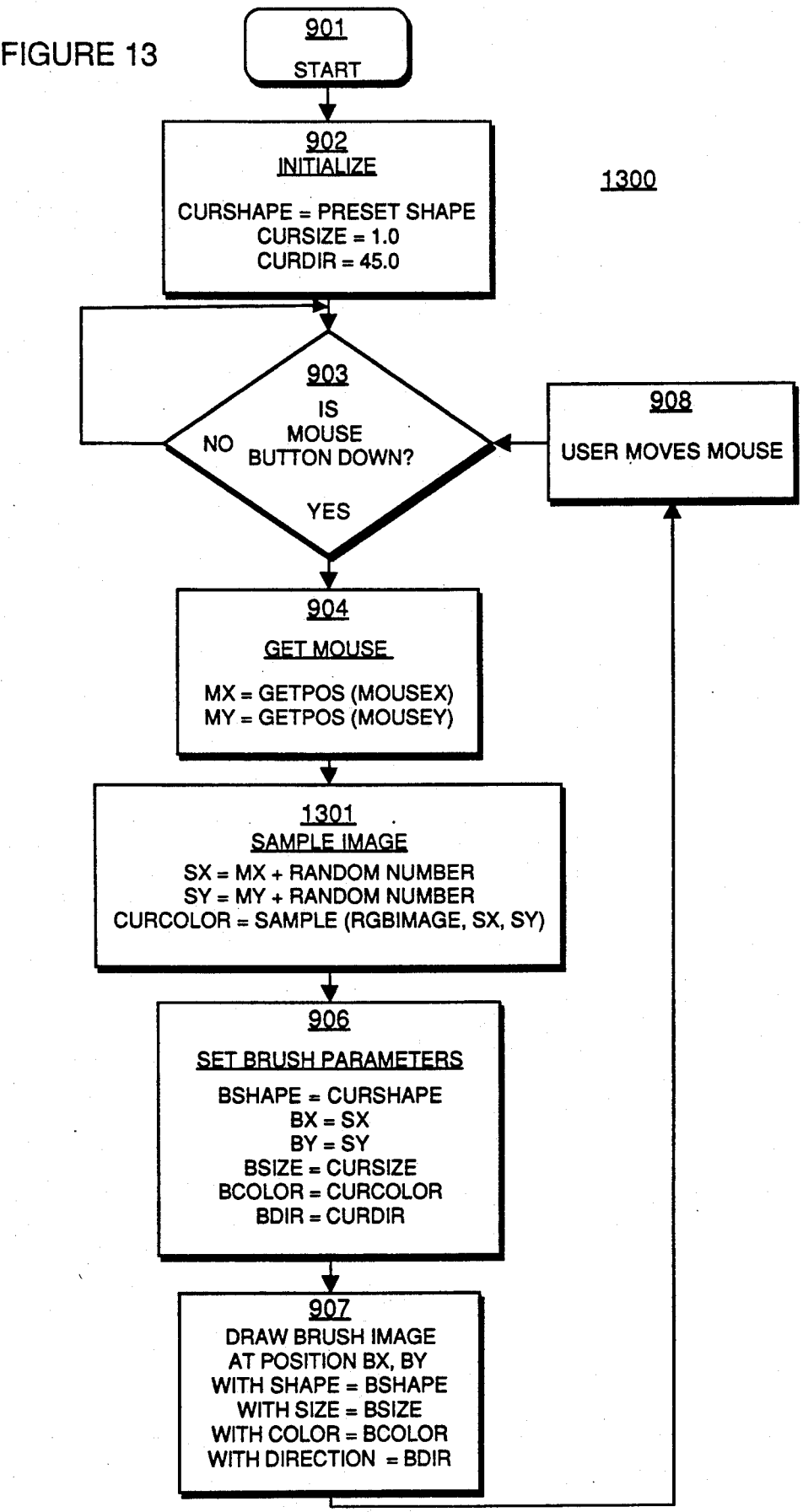
FIG. 13 is a flowchart of an alternative embodiment wherein the sampled location for the current color is perturbed by a random number generator.

An enhancement to the simple painting process 900 of FIG. 9 is to perturb each individual brush stroke by using a random number generator. By perturbing a given value for the brush strokes, the resulting painting can be distorted in a manner of the user's choosing. For instance, the sampled position at which the current color is determined can be offset, and thus a color will be sampled from a pixel at a different location from that of the currently determined cursor position. FIG. 13 shows this process. Process 1300 shown in FIG. 13 implements the same brush stroke process in an interactive mode as process 900 in FIG. 9, except that step 905 is replaced by step 1301, wherein the current cursor position is perturbed by a random number generator prior to sampling for a current color. Therefore, instead of setting the current X-Y position and the current color equal to the color of the pixel residing at that location as shown in step 905, step 1301 offsets the sampled X and Y values by a random number, and then the current color is sampled from a source image at the new pixel location. The process 1300, like process 900 in FIG. 9, continues in the same fashion by setting the brush parameters at step 906, drawing the brush at the brush position parameters using the resulting sampled shape, size, color, current direction, and offset sampled position at step 907, and allowing the user to move the mouse as long as the mouse button is depressed at steps 908 and 903. As in process 900, process 1300 will repeat steps 903, 904, 1301, 906, 907 and 908 as long as the mouse button is depressed.

Figure 14:
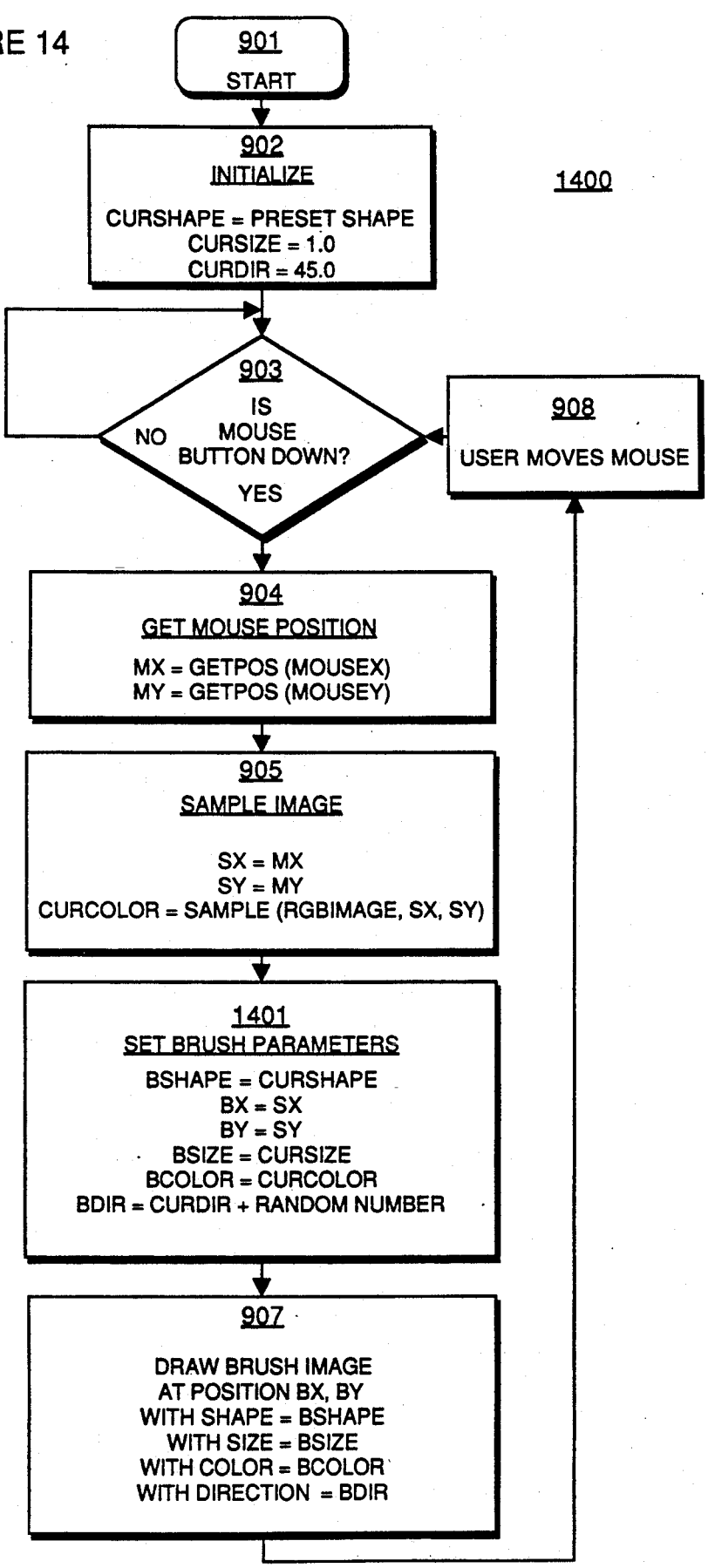
FIG. 14 is a flowchart of an alternative embodiment which uses a random number generator to perturb the direction in which the brush stroke is made.

Process 1400 shown in FIG. 14 also uses a random number generator, but process 1400 uses the random number generator in order to perturb the current brush stroke direction. Process 1400 comprises the same steps as process 900 in FIG. 9, except that step 906 is now replaced by step 1401. Step 1401 sets the brush stroke parameters, and will set the brush stroke direction equal to the current brush stroke direction perturbed by a random number. The brush stroke X and Y position are still set to the brush position, the brush stroke shape is set to the current shape, the brush stroke size and color are still set to the current size and current color, and the brush stroke direction is set to the current direction. The brush image is drawn at step 907. Process 1400 then moves on to step 908. Process 1400 will repeat steps 903, 904, 905, 1401, 907 and 908 as long as the mouse button is depressed. Brush strokes are therefore drawn.

Figure 15:
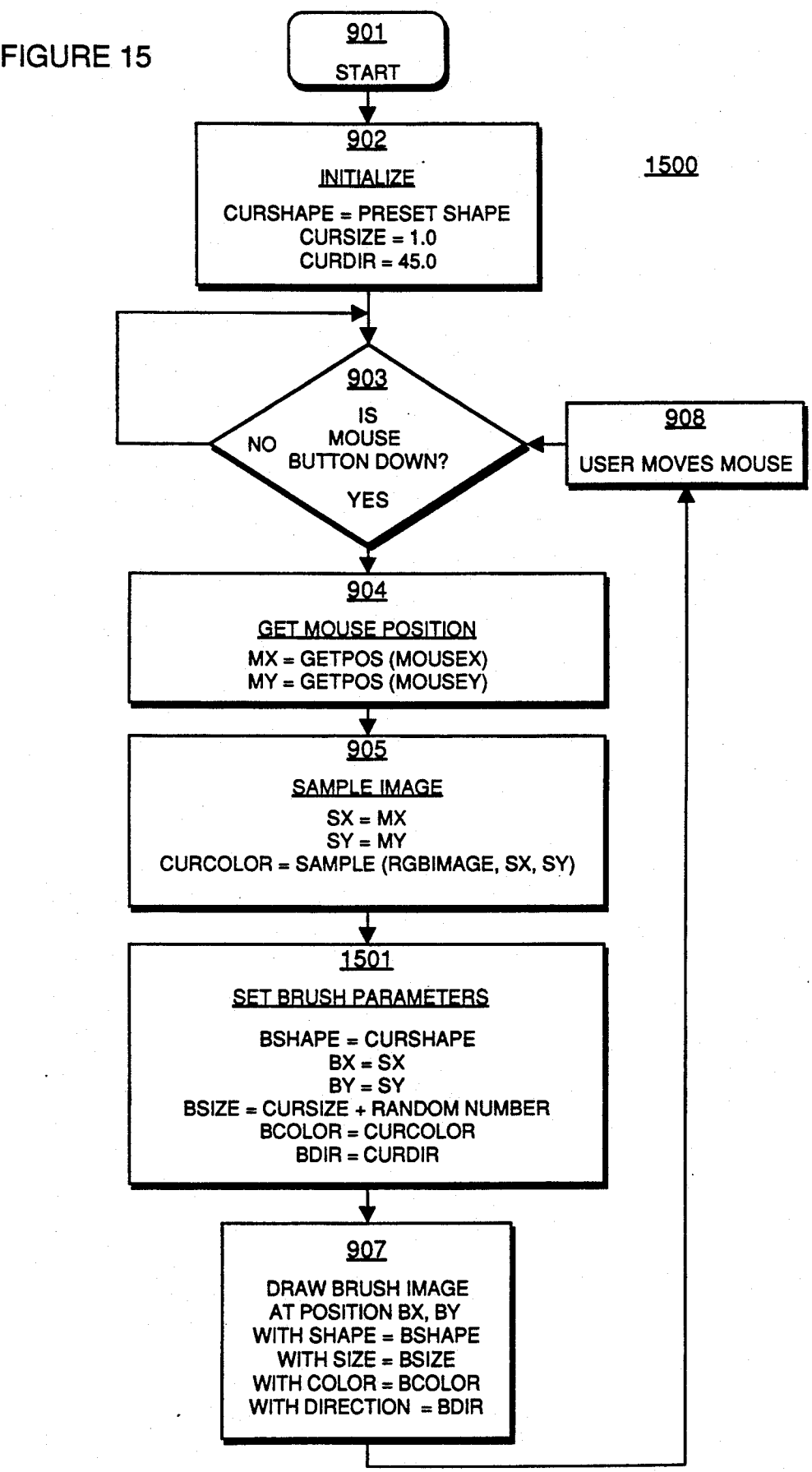
FIG. 15 is a flowchart of an alternative embodiment wherein the brush stroke size is perturbed by a random number generator.

Another technique is process 1500 of FIG. 15. Process 1500 uses a random number generator to perturb the brush stroke size. In process 1500, step 906 of process 900 is now replaced by step 1501. Step 1501 perturbs the brush stroke size using a random number generator. In step 1501, instead of setting the brush stroke size to the currently determined brush stroke size as in step 906, process 1500 at step 1501 sets the brush stroke size equal to the current brush stroke size plus a random number. In step 1501, the remaining brush stroke parameters are set in the same manner as in process 900, wherein, the brush stroke shape is set to the current shape, the brush stroke X and Y position are set to the current position, and the brush color and direction are set to the current color and current direction, as in step 906 of process 900. A brush image is drawn at step 907. Process 1500 then moves to step 908. Process 1500 will repeat steps 903, 904, 905, 1501, 907 and 908 in the same manner as in process 900 as long as the mouse button is depressed. Brush strokes are thereby drawn.

Figure 16A:
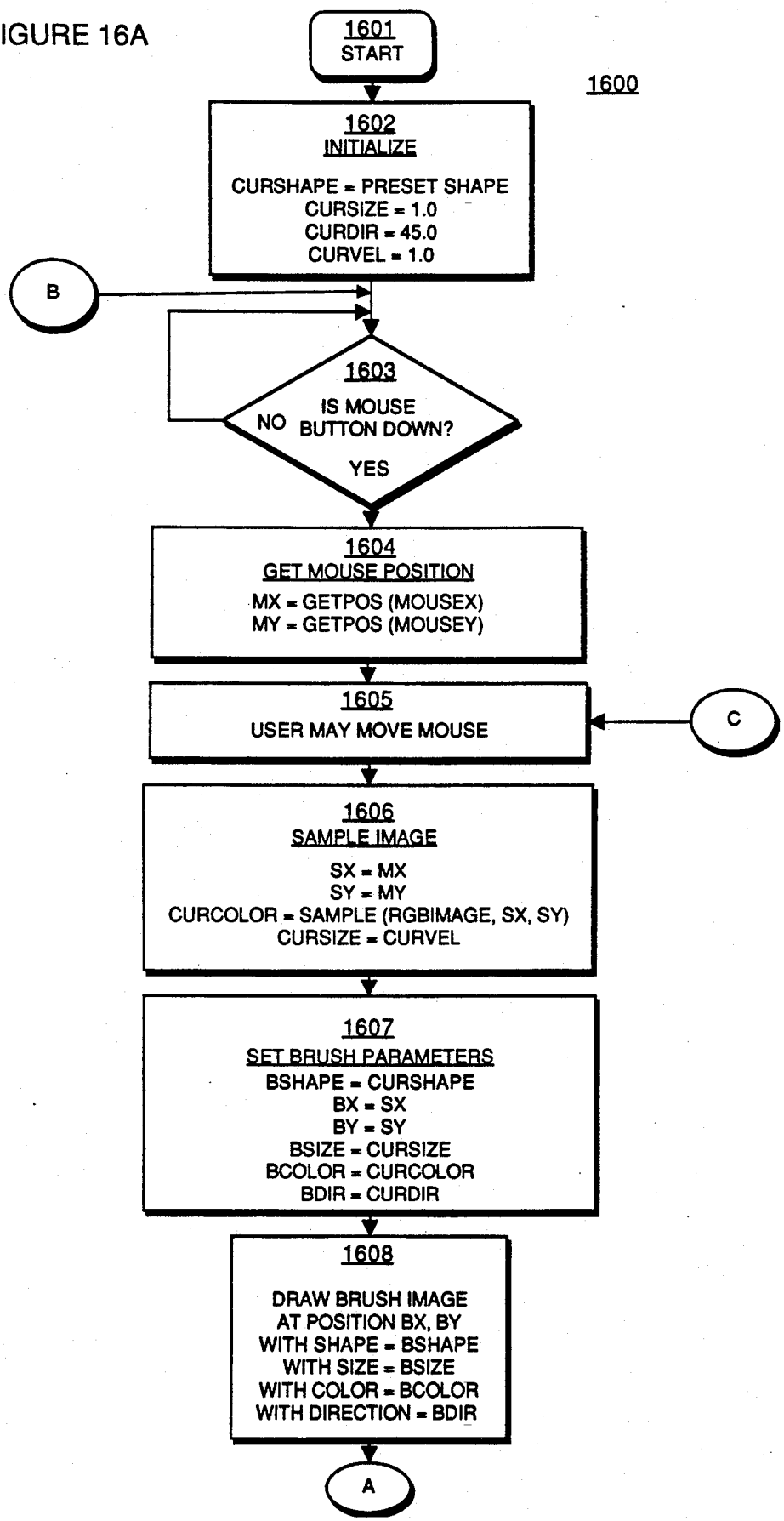
FIGS. 16A and 16B are flowcharts showing an alternative embodiment wherein the speed of a mouse movement determines the brush stroke size.
Figure 16B:
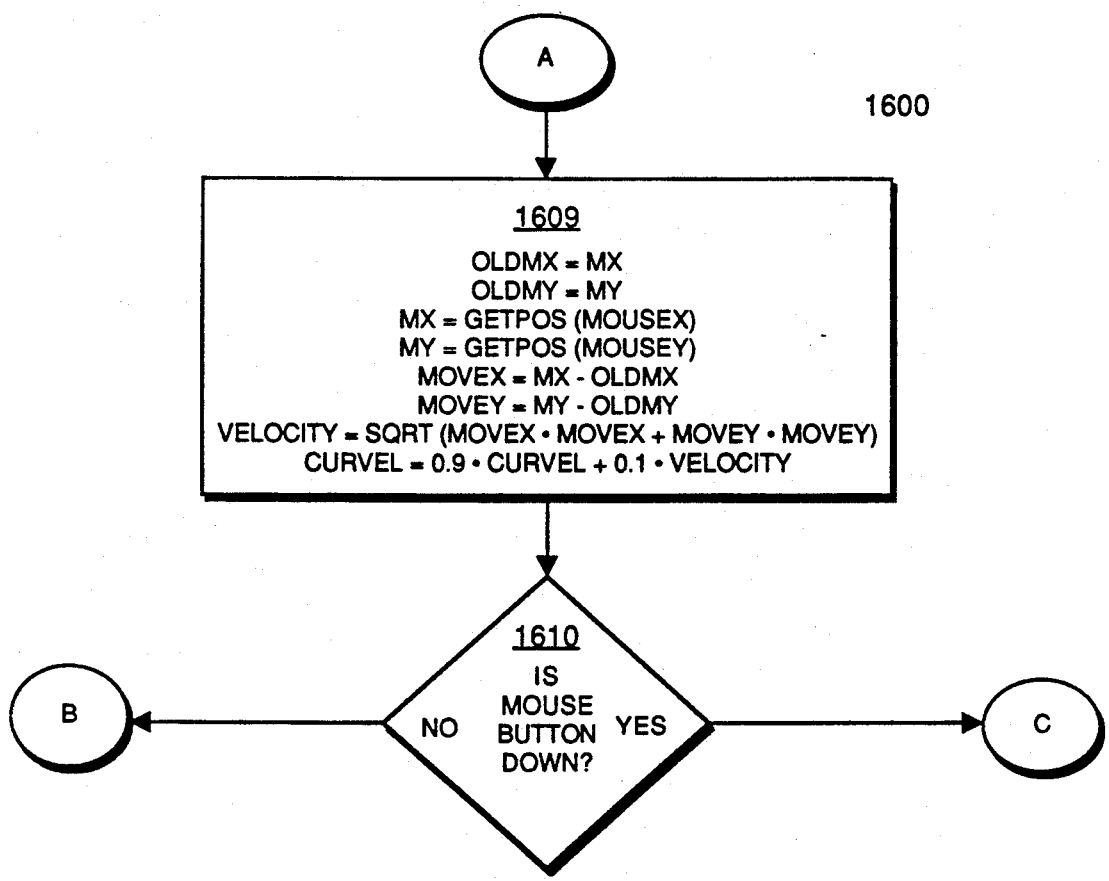

Another technique is shown in FIGS. 16A and 16B. In process 1600 in FIGS. 16A and 16B, the size of the brush stroke will vary according to the speed at which the user moves the mouse or other input device 123 of FIG. 1. Process 1600 starts at step 1601 in FIG. 16A and proceeds at step 1602 to initialize the current shape, the current size, and current direction of the brush stroke, and the current velocity of the mouse. Process 1600 proceeds to step 1603, which will check to see if the mouse button has been depressed. If it has not, then process 1600 stays in a loop, testing the mouse button at step 1603 until it is determined that the mouse button has been depressed. Once step 1603 determines that the mouse button has been depressed, step 1604 determines the X and Y displacement of the cursor on the screen according to the mouse position. At step 1605 the user may move the mouse, and process 1600 then proceeds to step 1606, which sets the current X-Y position equal to the sampled X-Y position and sets the current color equal to the color of the input image at that location. Lastly, step 1606 sets the current brush stroke size equal to a current velocity which has either been initialized previously or determined according to step 1609 (discussed below). Process 1600 then proceeds to step 1607 setting the brush parameters equal to the currently determined parameters. Then, process 1600 proceeds to step 1608 and draws the brush in the manner described in process 500 of FIG. 5, using the brush shape, the brush color, the brush size, the brush direction, and the brush position, which were set previously. Process 1600 then proceeds to step 1609 in FIG. 16B, wherein the old mouse X and Y position values are saved, and the new mouse X and Y positions are sampled from the current cursor position. The displacement between each of the old X-Y and the new X-Y positions are then determined. The sum of the squares of the displacements between the old and new X, Y values is determined and an instantaneous velocity of the mouse is set to the square root of that sum. Step 1609 proceeds to determine a new current velocity (used in determining the brush stroke size) by multiplying the current velocity by a weighted value (here, the weighted value is equal to 0.9), and the instantaneous velocity is multiplied by a weighted value (0.1). The current velocity is then set at step 1609 to the sum of these two products. Step 1609 proceeds to step 1610, wherein process 1600 determines whether the mouse button that indicates painting is still depressed, and if it is, process 1600 proceeds to step 1605 of FIG. 16A, wherein the user may move the mouse again. Steps 1605 through 1610 are repeated until such time as the user stops painting, as indicated by a released mouse button. If the mouse button is no longer depressed, step 1610 proceeds to the beginning of the routine at step 1603 in FIG. 16A, and the process will again loop, waiting for a depressed mouse button indicating painting.

Process 1600 shown on FIGS. 16A and 16B will generate very small brush strokes on slow movements of the mouse, while fast movements will generate very large brush strokes. Process 1600 described herein is analogous to an artist making brush strokes on a canvas, wherein an accelerated speed of a particular brush movement will yield a large brush stroke with obscured detail, and slower movements of the brush will yield much smaller, more detailed brush strokes. In process 1600, brush stroke size on the output image will vary according to the speed at which the cursor movement is made.

Figure 17A:
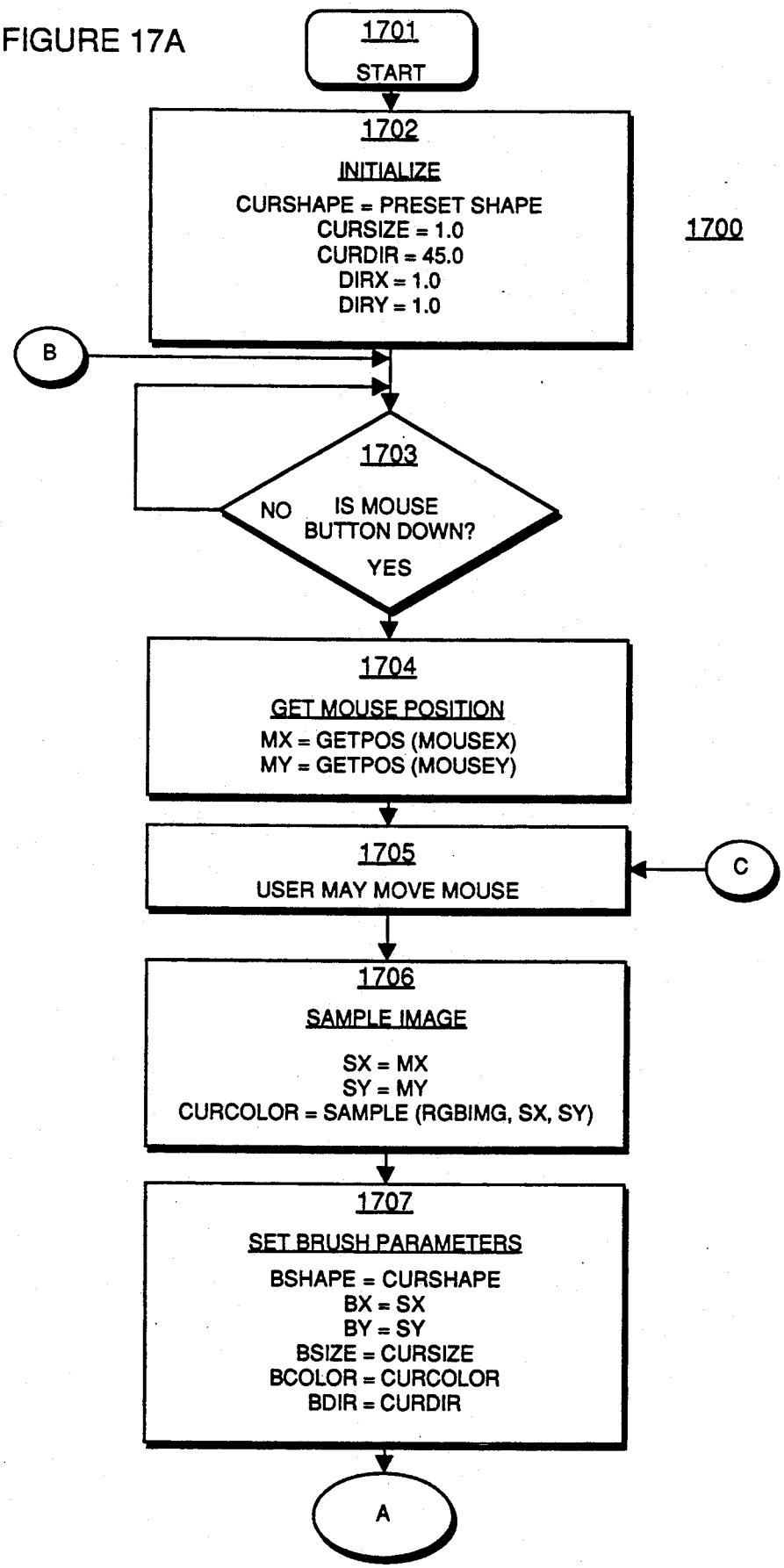
FIGS. 17A and 17B are flowcharts showing an alternative embodiment that uses the mouse movement during painting to control the brush stroke direction.

Another technique utilizes the current mouse direction to alter the brush stroke painting direction. This embodiment is shown on FIGS. 17A and initializes at 1702 the current brush stroke shape, the current brush stroke size, the current painting direction, the current X direction of the mouse movement, and the current Y direction of the mouse movement. Step 1703 determines whether the mouse button has been depressed. If the mouse button has not been depressed, step 1703 repeats until such time as it has been depressed. On the other hand, if the mouse button has been depressed, step 1703 then proceeds to step 1704, which will sample the current X and Y position of the cursor on the display. 1704 leads to step 1705, wherein the user may move his mouse. Then, at step 1706, the current color is set equal to the color of the pixel on the input image residing at the current X and Y location of the mouse as sampled previously.

Figure 17B:
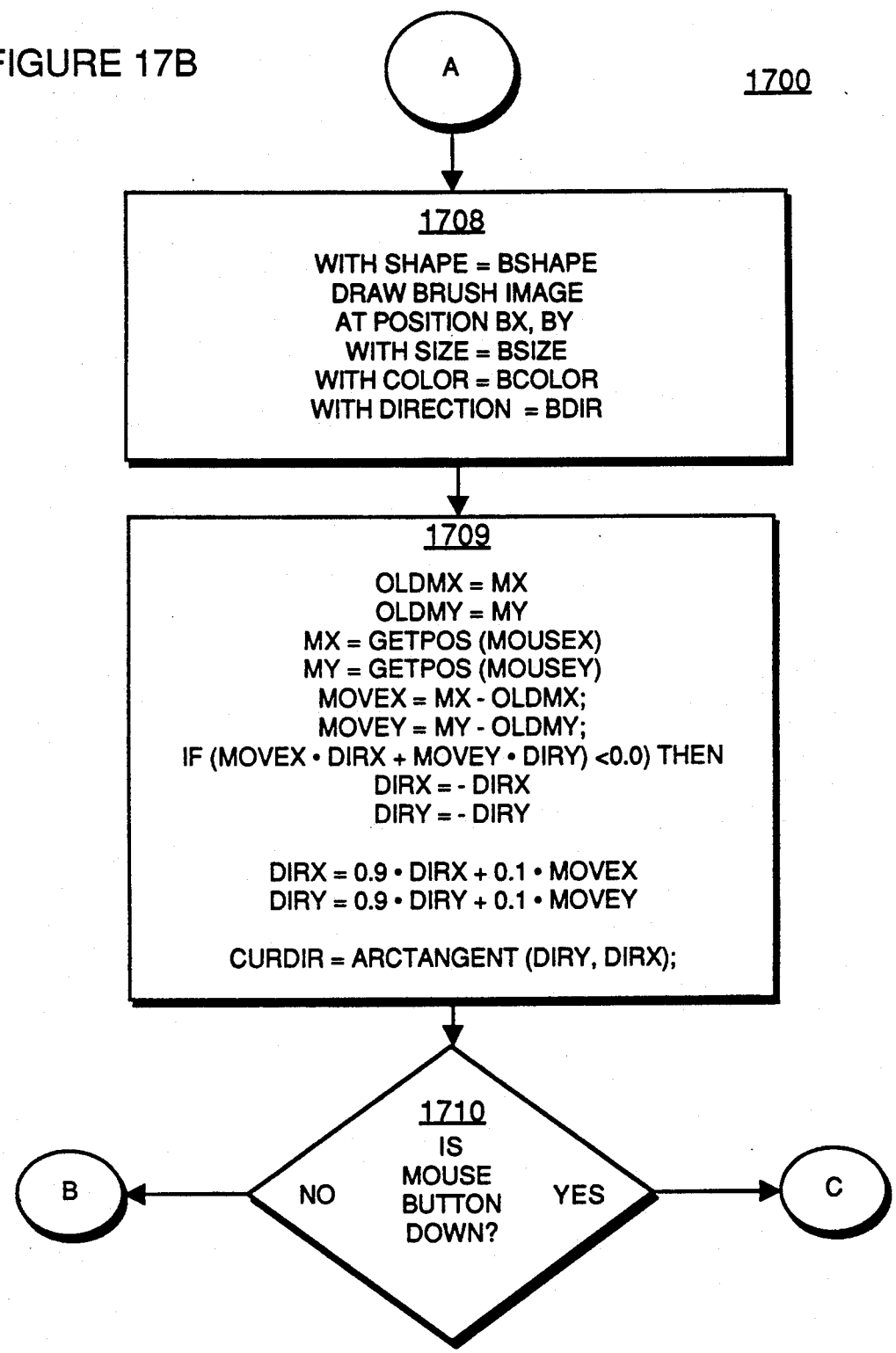

Process 1700 proceeds to step 1707, which sets the brush stroke parameters according to the current shape of the brush stroke, the current X and Y position of the cursor, the current size of the brush stroke, the current color of the brush stroke, the current direction of the brush stroke which is being painted. Step 1707 then leads to step 1708 of FIG. 17B, which draws the brush using the brush parameters previously set in the manner set forth in process 500 in FIG. 5. Step 1708 then proceeds to step 1709 of process 1700, which sets the old mouse position equal to the current mouse position, samples a current position of the cursor to obtain a new position, and determines the displacement between the old position and the new position. Step 1709 determines whether the sum of the product between the displacements and the current direction for the X and Y movements respectively are less than zero. If they are, step 1709 sets the current X and Y directions for the brush stroke equal to the product of those values multiplied by −1. Step 1709 then proceeds to set the current direction of the X movement and the current Y direction movement equal to a weighted value (in this case, 0.9) of each of the X and Y values' direction, added to a weighted value (0.1) of the instantaneous movement values. Step 1709 proceeds to set the current direction of the brush stroke equal to the arctangent of the Y direction and the X direction yielding a current brush stroke direction. The arctangent function operates in the same manner as discussed with reference to FIG. 12. Step 1709 proceeds to step 1710 which again checks to see if the mouse button is still depressed. If step 1710 determines that the mouse button is still depressed, then it proceeds to step 1705 in FIG. 17A, and steps 1705 through 1710 are repeated in the manner described above, as long as the mouse button is depressed. If the mouse button is no longer depressed, step 1710 jumps to step 1703 in FIG. 17A, which samples the mouse button repeatedly until such time as the user again depresses it and indicates to the computer system that he or she wishes to start painting. Steps 1705 through 1710 are repeated as long as the mouse button is depressed, thereby drawing the brush strokes.

Figure 18A:
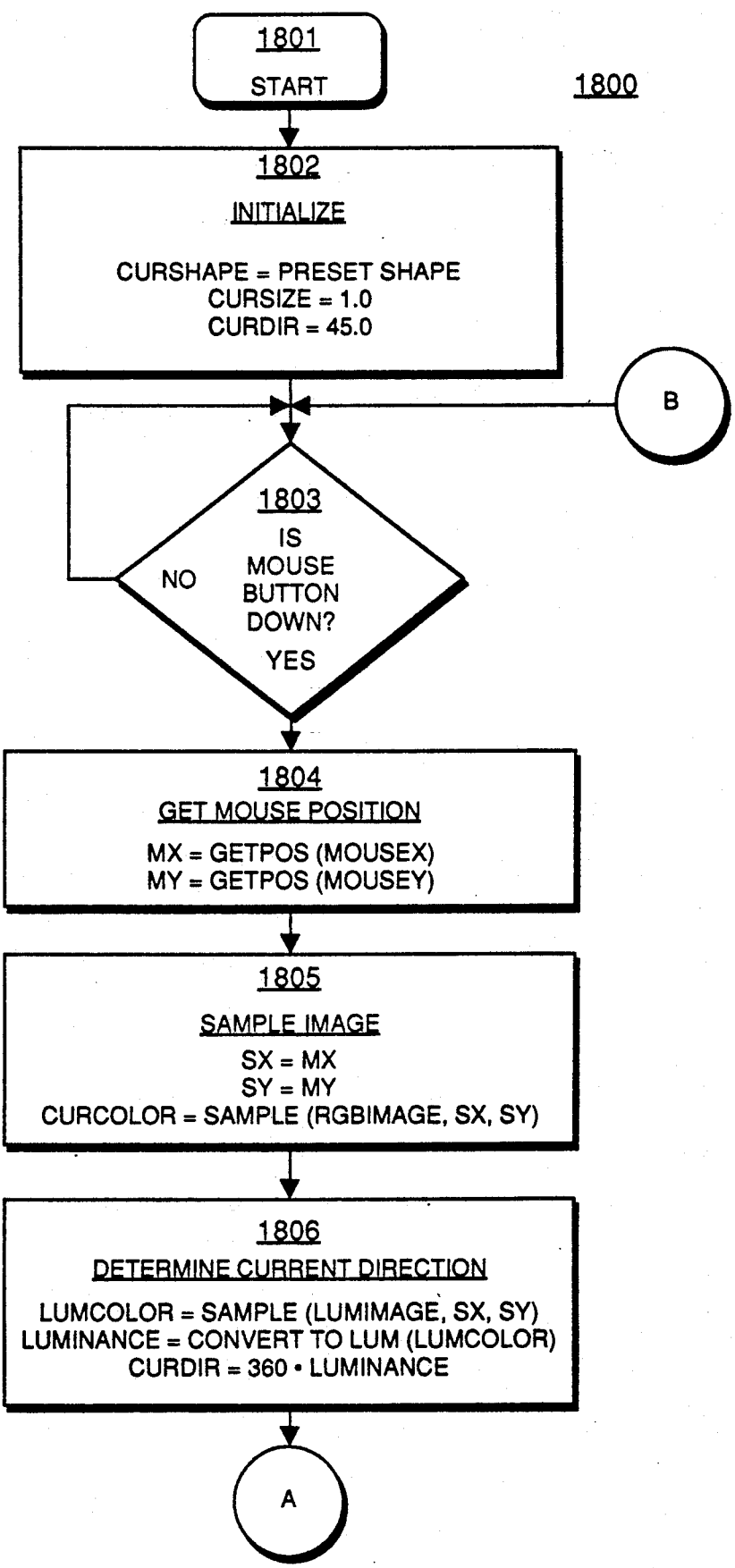
FIGS. 18A and 18B set forth steps for having a luminance value of a pixel on a second image control the brush stroke direction for the final image.
Figure 18B:
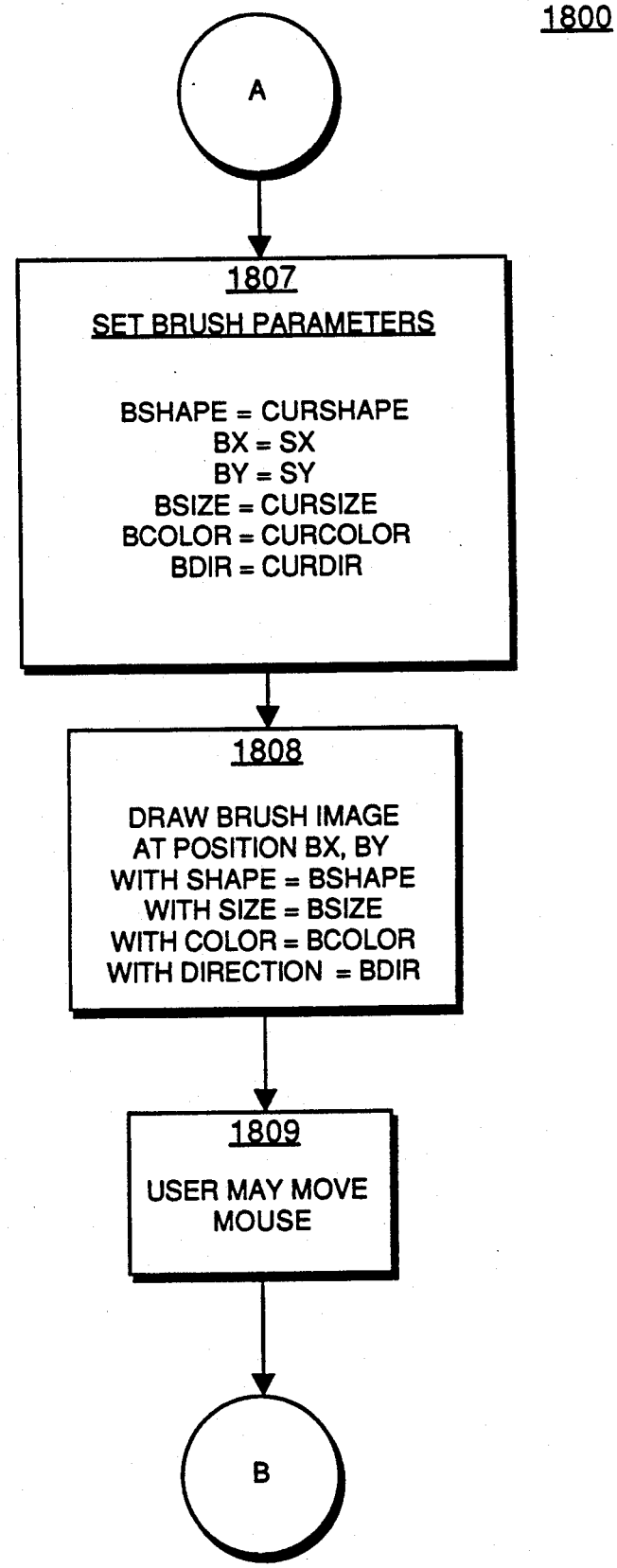

Another technique is to use another image to control the brush stroke direction on the resulting painting. In this example, a luminance value is determined from an image controlling the brush stroke, and the luminance value is used to modify the brush stroke direction on the resulting painting. The process for controlling the brush stroke direction with another image is shown as process 1800 of FIGS. 18A and 18B. Process 1800 starts at step 1801 in FIG. 18A and proceeds to initialize the current shape, the current size, current direction variables at step 1802. At step 1803, process 1800 checks to see whether the mouse button has been depressed, indicating that the user wishes to start painting. If the mouse button has not been depressed, step 1803 loops continuously waiting for activity on the mouse button. If the user has depressed the mouse button and wishes to start painting, process 1800 proceeds to step 1804, which samples the current cursor position on the screen by the position of the mouse. Step 1804 proceeds to step 1805, which then samples the input image setting the current X and Y locations equal to the sampled mouse X and Y positions and the current color equal to the color of the pixel residing at that location on the input image. Step 1805 then proceeds to step 1806, which determines the current direction of the brush stroke based upon the luminance image. First the color is sampled at the X and Y position obtained from the cursor position in the luminance image. Then, a luminance value is determined from the color sampled from the luminance image, yielding a value between 0 and 1. A luminance value may be generated from a red, green and blue color value as used in the preferred embodiment by multiplying the red component of the color by 5, the green component by 9, and the blue component by 2. Then, the three products are added together and divided by 16 (the sum of 5, 9, and 2), resulting in a luminance value. The luminance value will then have a range between 0 and 1, and the current direction of the brush stroke may be obtained by multiplying the maximum value for the brush stroke direction (e.g. 360 in a Euclidean coordinate system) by the luminance value determined. Step 1806 then proceeds to 1807 in FIG. 18B, wherein the brush parameters are set to the current X and Y position, the current size, and the current color. In addition, at step 1807 the brush direction parameter is set to the current direction, as determined by the luminance image in step 1806. Step 1808 then invokes the draw brush process, which draws a brush using a technique similar to that in process 500 of FIG. 5 according to the brush parameters set in step 1807. Process 1800 proceeds to step 1809, and the user may move the mouse again, and 1809 leads to step 1803 wherein the mouse button is again checked to see if it is still depressed. If the mouse button is still depressed, steps 1803 through 1809 are executed in the same manner as discussed above. If, however, the mouse button is no longer depressed, step 1803 loops repeatedly waiting for activity on the mouse button indicating that the user wishes to paint.

An example of using an image to control the brush stroke direction according to its luminance is shown as 1900 in FIG. 19, and the resulting image is shown as 1901 in FIG. 19. Image 1901 in FIG. 19 has been generated using the original image 801 of FIG. 8.

Another technique uses the direction of the gradient of an input image in order to determine the brush stroke direction. The second image gradient is determined prior to processing the first image. Then the first image is processed much in the same way as in process 1800 in FIG. 18 after the direction of the gradient is determined. An example of the conversion technique is shown as process 2000 in FIG. 20. Process 2000 starts at step 2001 in FIG. 20A and then proceeds to step 2002, which blurs the input image using a convolution technique. Convolution is part of the larger subset of algorithms for image smoothing. Convolution is described in *Digital Image Processing* (Addison-Wesley 2d Ed. 1986) by Rafael C. Gonzales and Paul Wintz at pages 161 through 172. The resulting blurred image in step 2003 is stored in a file called "BLURIMAGE." The result of such blurring is shown on FIG. 21 as image 2101.

Step 2003 initializes the current pixel position variable to the first pixel in the BLURIMAGE file. Then, at step 2004, the BLURIMAGE file is checked to see if all of the pixels have been processed. If they have, then process 2000 ends at step 2005. Process 2000 proceeds to step 2006 in FIG. 20, which determines the current direction of the gradient based upon the blurred image. This is accomplished by sampling the colors of the pixels surrounding the current pixel location to determine the gradient direction. The neighboring pixels to the upper left, to the upper right, to the lower left, and to the lower right of the pixel are sampled to determine their colors. Each of these pixels' colors is shown in step 2006 as V00, V01, V10, and V11. Then, step 2006 proceeds to determine the change over X (DPDX) and the change over Y (DPDY) of the color in the gradient image. This is accomplished by setting DPDX equal to the difference between the sum of V00 and V10 subtracted from the sum of V01 and V11. DPDY is set to the difference between the sum of V00 and V01 subtracted from the sum of V10 and V11. Then, the current brush stroke direction is set to 360 degrees minus the value of the arctangent of DPDX divided by DPDY, yielding the final direction of the gradient on which a brush stroke may be made. The arctangent function here operates in the same manner as discussed with respect to FIG. 12. Step 2006 proceeds to steps 2007, which stores the current direction determined in step 2006 in a location associated with the current pixel location in a file known as "GRADIMAGE." Step 2007 proceeds to step 2008 which proceeds to the next pixel in the BLURIMAGE file. Step 2008 loops back to 2004, which again tests for an end of file condition. As mentioned previously, step 2004 will proceed to step 2005 if the end of the BLURIMAGE file has been reached. If the end of the BLURIMAGE file has not been reached, then steps 2006 through 2008 will be repeated for each pixel in the blurred image file and stored in the gradient image file "GRADIMAGE."

Figure 20:
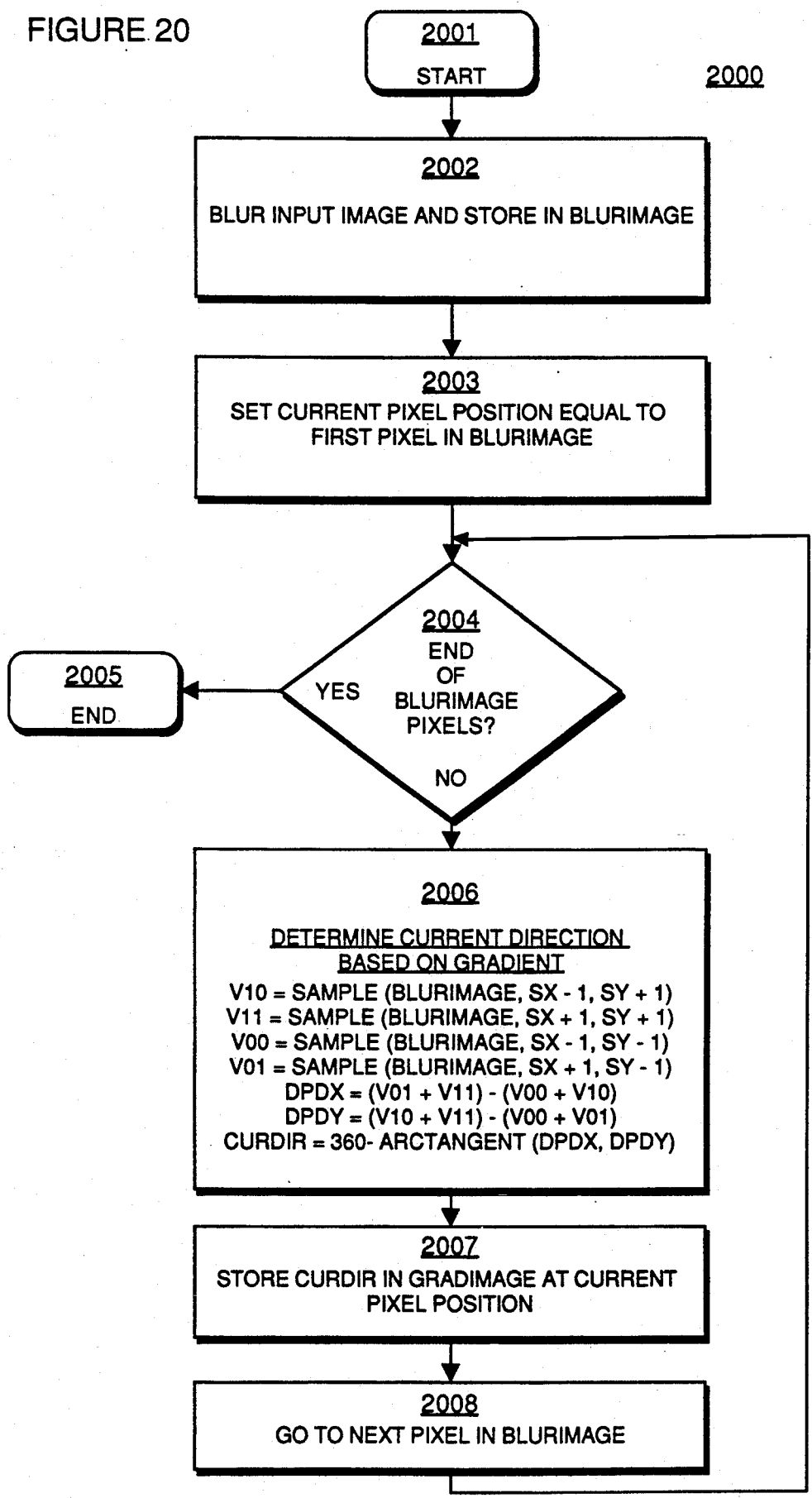
FIG. 20 shows a method for determining the direction of gradient of an image in order to control the brush stroke direction.

The result of the technique discussed with reference to FIG. 20 is shown in FIG. 21 using image 801 of FIG. 8 as an input image. FIG. 21 shows the result of the blurring step 2003 as 2101. The result of determining and storing the direction of the gradient steps 2006 through 2008 is shown as image 2102 in FIG. 21.

Figure 22A:
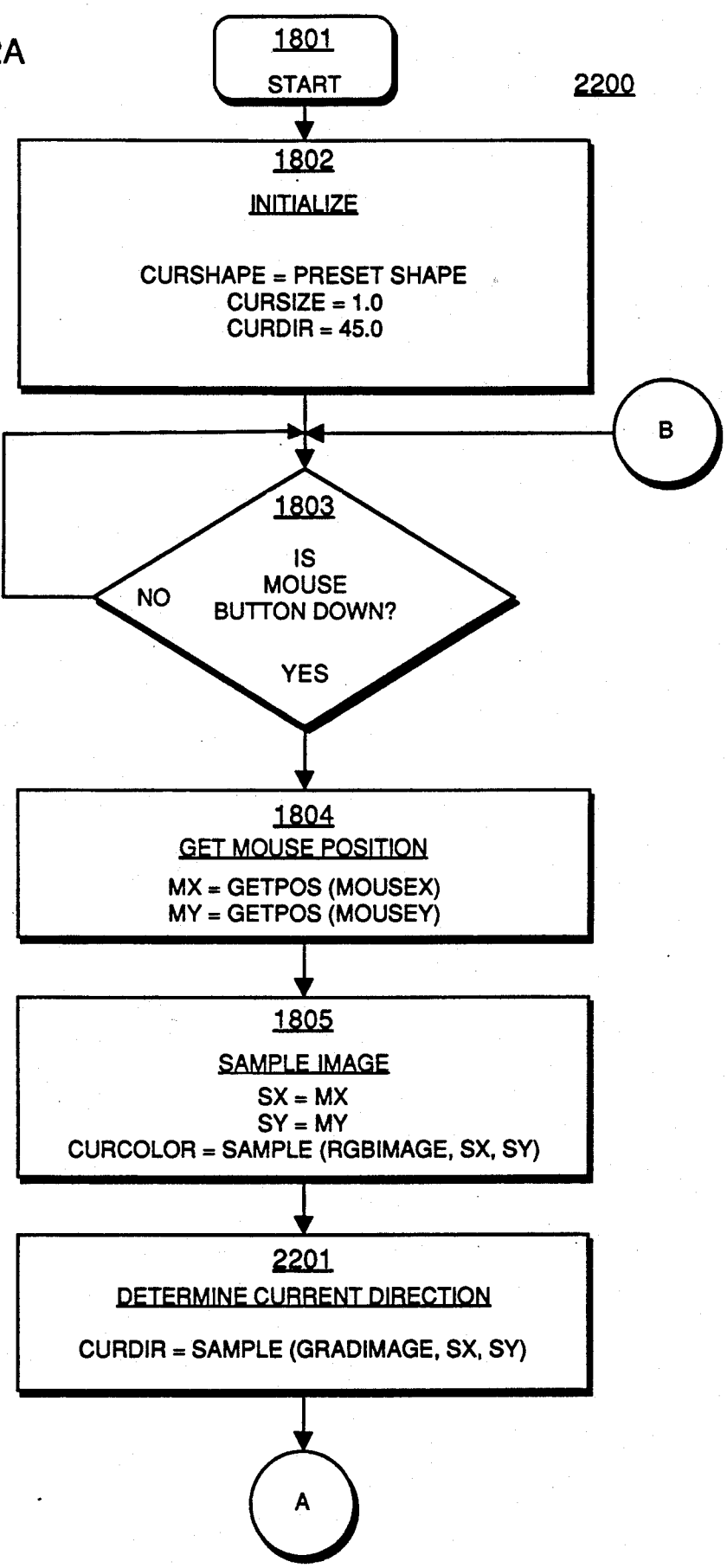
FIGS. 22A and 22B sets forth steps for generating an image by controlling the brush stroke direction with the gradient of another image.
Figure 22B:
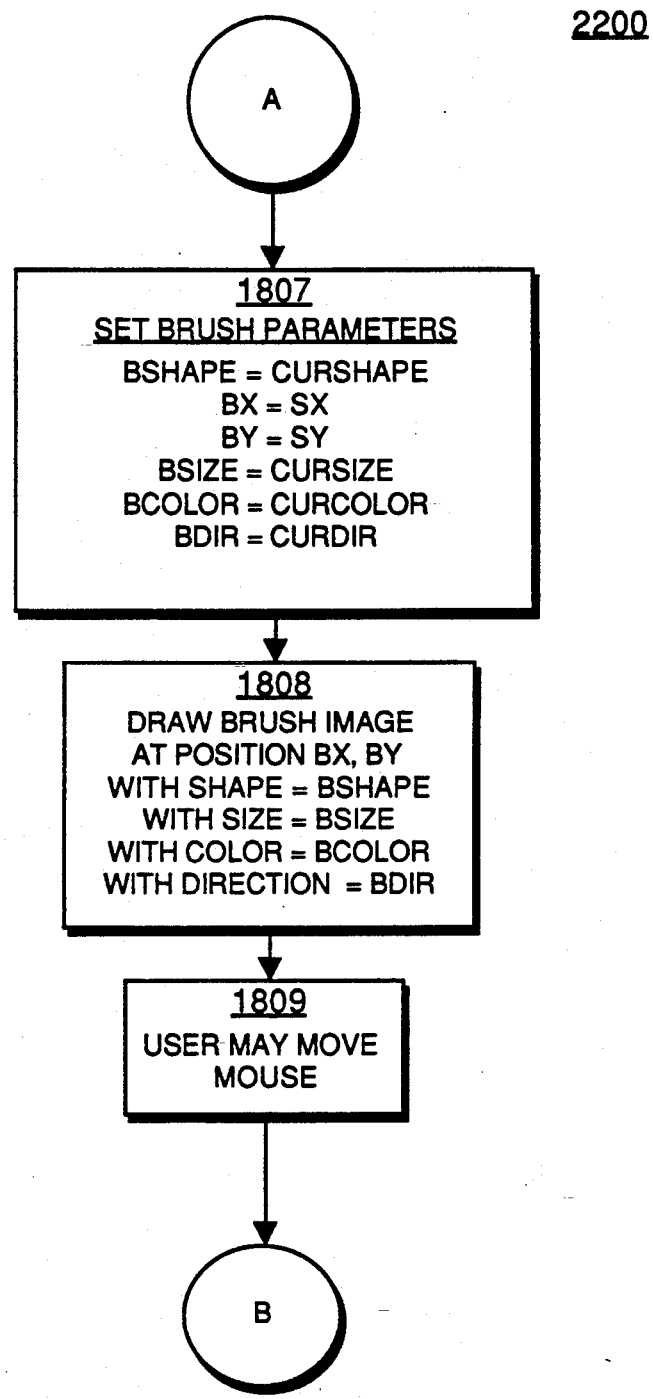

Once a gradient image has been determined from a second image as discussed with reference to FIG. 20 described above, the gradient image may be used to control the brush stroke direction to process an input image. The image used to determine the gradient image may be the same image which is to be processed, or a third image of the user's choosing. The process for painting using the gradient image to control the brush stroke direction is shown in FIGS. 22A and 22B as process 2200. Process 2200 is essentially the same process as 1800 of FIG. 18, except that step 1806 has now been replaced by step 2201, which sets the current brush stroke direction equal to the value stored at the current location in GRADIMAGE. Process 2200 starts at step 1801 in FIG. 22A proceeds to initialize the current shape, current size, and current direction variables at step 1802. At step 1803, process 2200 checks to see whether the mouse button has been depressed, indicating that the user wishes to start painting. As in the previous examples, if the mouse button has not been depressed, step 1803 loops continuously waiting for activity on the mouse button. If the user has depressed the mouse button, and wishes to start painting, process 2200 proceeds to step 1804, which samples the current position on the screen by the position of the mouse. Step 1804 proceeds to step 1805, which samples the input image setting the current X and Y locations equal to the sampled mouse X and Y positions and the current color equal to the color of the pixel residing at that location on the input image. Step 1805 then proceeds to step 2201, which determines the current direction of the brush stroke based upon the gradient image. The current direction is set to the value stored in the gradient image at the current X and Y position, which was determined and stored previously in the file "GRADIMAGE" from process 2000 in FIG. 20. Step 2201 then proceeds to step 1807 in FIG. 22B, wherein the brush parameters are set to the current shape, current X and Y position, the current size, and the current color. At step 1807, the brush direction is also set to the current direction, as determined by the gradient image in step 2201. Step 1808 then invokes the drawbrush process, which draws a brush using a technique similar to that in process 500 of FIG. 5 according to the brush parameters set in step 1807. Process 2200 proceeds to step 1809 wherein the user may move the mouse again, and then leads to step 1903 wherein the mouse button is again checked to see if it is still depressed. If the mouse button is still depressed, steps 1803, 1804, 1805, 2201, 1807, 1808, and 1809 in the same manner as discussed above. If however, the mouse button is no longer depressed, step 1803 loops repeatedly waiting for activity on the mouse button indicating that the user wishes to paint.

Image 2103 of FIG. 21 is an example of the result of using an image to control the brush stroke direction according to the gradient of a second image. Image 2103 has used the original image 801 in FIG. 8 to determine the direction of the gradient. As discussed previously, 2101 shows the original image after blurring, 2102 shows the gradient image, and 2103 is the final processed image. It can be appreciated that a second image's gradient may be determined and used to control the brush stroke direction on the final processed image, and one is not limited using the original image as illustrated in FIG. 21.

The various schemes for altering the current brush stroke size, the current brush stroke direction, the current brush stroke color, and the current sample position of the brush color may be modified in the various ways described herein, as well as used in combinations thereof. The detailed description should in no way be viewed as restrictive with respect to the present invention. Furthermore, various input devices such as a track ball, cursor control keys, and other devices that provide input positions in an X and Y direction may be used. In addition, schemes may be implemented on various computer systems in which the specific representation of the brush strokes, colors, and pixel positions varies according to the representation on the particular computer system. The order of the fields in the brush stroke datum may also be changed.

In the foregoing specification the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of painting in a computer controlled video display system, comprising the steps of:
 (a) determining a current shape of a brush stroke, wherein the brush stroke is a representation of an image to be displayed on the display system;
 (b) determining a current direction of the brush stroke;
 (c) determining a current position on a first image;
 (d) setting a current size of the brush stroke based on a current velocity of the movement of a user-actuated input device;
 (e) automatically setting a current color equal to a color at the current position on the first image; and
 (f) placing a copy of a brush image into a second image, wherein the brush image has a same shape as the brush stroke, comprising the steps of:
  (i) setting a color of the brush image equal to the current color;
  (ii) setting a position of the brush image equal to the current position;
  (iii) setting a direction of the brush image equal to the current direction of the brush stroke; and
  (iv) setting a size of the brush image equal to the current size of the brush stroke.

(g) determining a next position of a brush stroke on the first image;
(h) setting an instantaneous velocity based on a distance between the current position and the next position;
(i) setting the current velocity equal to a sum of a weighted value of the current velocity and a weighted value of the instantaneous velocity;
(j) setting the current position equal to the next position;
(k) if a user wishes to continue to paint, then repeating steps (d) through (j).

2. A method of painting in a computer controlled video display system, comprising the steps of:
(a) determining a current position on a first image of a brush stroke, wherein the brush stroke is a representation of an image to be displayed on the display system;
(b) determining a current shape of the brush stroke;
(c) determining a current size of the brush stroke;
(d) determining a current direction of the brush stroke;
(e) initializing a current X direction value to one and initializing a current Y direction value to one;
(f) automatically setting a current color equal to a color of a pixel at the current position in the first image;
(g) determining a next position on a first image of a brush stroke;
(h) determining a distance (1) between a first X value of the current position and a second X value of the next position and (2) between a first Y value of the current position and a second Y value of the next position;
(i) if the sum of (1) a product of the current X direction value and the distance between the first and second X values and (2) a product of the current Y direction value and the distance between the first and second Y values is less than zero, then setting the current X direction value equal to the current X direction value multiplied by $-1$ and setting the current Y direction value equal to the current Y direction value multiplied by $-1$;
(j) setting the current X direction value equal to a sum of a weighted value of the current X direction value and the distance between the first and second X values;
(k) setting the current Y direction value equal to a sum of a weighted value of the current Y direction value and the distance between the first and second Y values;
(l) setting the current brush stroke direction equal to the arctangent of the current Y direction value divided by the current X direction value;
(m) placing a copy of a brush image into a second image, wherein the brush image has a same shape as the brush stroke, comprising the steps of:
 (i) setting a color of the brush image equal to the current color;
 (ii) setting a position of the brush image equal to the current position of the brush stroke;
 (iii) setting a direction of the brush image equal to the current direction of the brush stroke; and
 (iv) setting a size of the brush image equal to the current size of the brush stroke.
(n) setting the current position equal to the next position.

(o) if a user wishes to continue to paint, then repeating steps (f) through (n).

3. A method of painting in a computer controlled video display system, comprising the steps of:
(a) determining a current position on a first image of a brush stroke, wherein the brush stroke is a representation of an image to be displayed on the display system;
(b) determining a current shape of the brush stroke;
(c) determining a luminance value of a pixel residing at the current position in a second image;
(d) setting a current direction equal to a product of a maximum possible current direction value and the luminance value divided by a maximum possible luminance value;
(e) determining a current size of the brush stroke;
(f) automatically setting a current color equal to a color of the pixel at the current position in the first image; and
(g) placing a copy of a brush image into a second image, wherein the brush image has a same shape as the brush stroke, comprising the steps of:
 (i) setting a color of the brush image equal to the current color;
 (ii) setting a position of the brush image equal to the current position of the brush stroke;
 (iii) setting a direction of the brush image equal to the current direction of the brush stroke; and
 (iv) setting a size of the brush image equal to the current size of the brush stroke.

4. A method of painting in a computer controlled video display system, comprising the steps of:
(a) storing in a second image a blurred copy of a first image;
(b) computing the gradient of the second image by performing the following steps:
 (i) automatically setting a first value equal to a color of a pixel one pixel down and one pixel to the left of position of a sampled pixel in the second image, a second value equal to a color of a pixel one pixel down and one pixel to the right of the position of the sampled pixel in the second image, a third value equal to a color of a pixel one pixel up and one pixel to the left of the position of the sampled pixel in the second image, and a fourth value equal to the color of a pixel one pixel up and one pixel to the right of the position of the sampled pixel in the second image;
 (ii) setting a fifth value equal to a difference between the sum of the second and fourth values and the sum of the first and third values;
 (iii) setting a sixth value equal to a difference between the sum of the third and fourth values and the sum of the first and second values;
 (iv) setting a seventh value equal to the product of $-1$ and the arctangent of the fifth value divided by the sixth value;
 (v) storing the seventh value in a third image in a location associated with the pixel position;
 (vi) repeating the above steps (i) through (v) for each pixel of the second image, wherein upon each repetition the sampled pixel is another pixel of the second image;
(c) determining a current shape of the brush stroke, wherein the brush stroke is a representation of an image to be displayed on the display system;
(d) determining a current size of the brush stroke;

(e) determining a current position on a fourth image;
(f) determining a current direction of the brush stroke based upon the value stored in the current position in the third image;
(g) setting a current color equal to a color of the pixel at the current position in the fourth image; and
(h) placing a copy of a brush image into a fifth image, wherein the brush image has a same shape as the brush stroke, comprising the steps of:

(i) setting a color of the brush image equal to the current color;
  (ii) setting a position of the brush image equal to the current position of the brush stroke;
  (iii) setting a direction of the brush image equal to the current direction of the brush stroke; and
  (iv) setting a size of the brush image equal to the current size of the brush stroke.

* * * * *